United States Patent [19]

Barry

[11] 4,124,129

[45] Nov. 7, 1978

[54] LOADER AND STORAGE SYSTEM

[76] Inventor: Leonard D. Barry, 19300 Pennington Dr., Detroit, Mich. 48221

[21] Appl. No.: 650,670

[22] Filed: Jan. 20, 1976

[51] Int. Cl.² .................... B65G 63/00; B65G 67/02; B60P 1/64

[52] U.S. Cl. .................................. 214/38 C; 104/28; 104/29; 214/151; 214/516

[58] Field of Search .............. 214/38 C, 38 CC, 38 D, 214/83, 83.3, 516, 16.1 CC, 16.1 CE, DIG. 10, 1 BC, 1 BH; 104/28, 29

[56] References Cited

U.S. PATENT DOCUMENTS

| | | | |
|---|---|---|---|
| 2,327,135 | 8/1943 | Scott | 214/83.3 |
| 3,190,467 | 6/1965 | English | 214/16.1 CE |
| 3,630,397 | 12/1971 | Batson | 214/38 C X |
| 3,904,046 | 9/1975 | Lunden | 214/6 DK |
| 3,984,019 | 10/1976 | Brudi et al. | 214/1 BC X |
| 3,991,889 | 11/1976 | Cox | 214/83 X |

*Primary Examiner*—Robert G. Sheridan

[57] ABSTRACT

This invention is a loader-unloader and storage system for loads such as cargo containers or trailers to transfer them to or from trains or vehicles moving by. This loader has a lift frame with forks or hooks for engaging under to hold a load. The frame is pivotally secured on a plurality of parallel crank arms each mounted to rotate on a vertical pivot to form a parallelogram linkage. The arms are supported on wheels that run on a circular track concentric under each crank arm. The track has slopes to lift and lower the arms together according to the rotary position of the arms and track to transfer loads to or from a vehicle having side latches coupled the the forks, the frame, or the load. A load receiver cooperates for removing loads from the lift frame non-stop so the loader can be used to unload or load successive loads. One receiver is a conveyor having two chain runs which receive the load from the loader and move the load back to clear a place to set the next load thereon. The empty load frame can be translated around its track to the coupling position before the next load is aligned for transfer. The conveyor works in reverse to spot successive loads for the loader to lift off and swing parallel to set on successive empty spots or berth on transport vehicles. The loader can be mounted on stationary pivot columns to load or unload vehicles moving by or be mounted on a vehicle to operate while the vehicle is either moving or stationary and/or be mounted on a turntable to turn around or turn loads 90° to and from a storage rack, conveyor, etc. The loader can be made to load and unload vehicles from either direction. A form of the loader supports loads at two levels on the frame to insert and remove adjacent containers on one pass.

27 Claims, 69 Drawing Figures

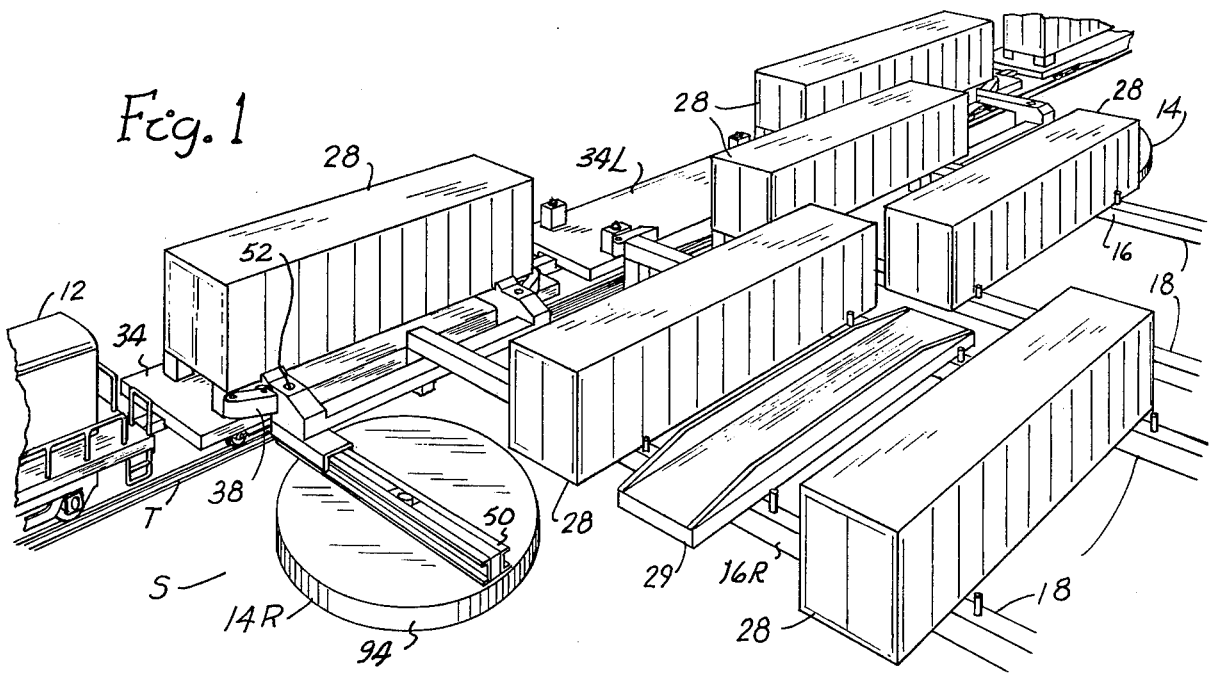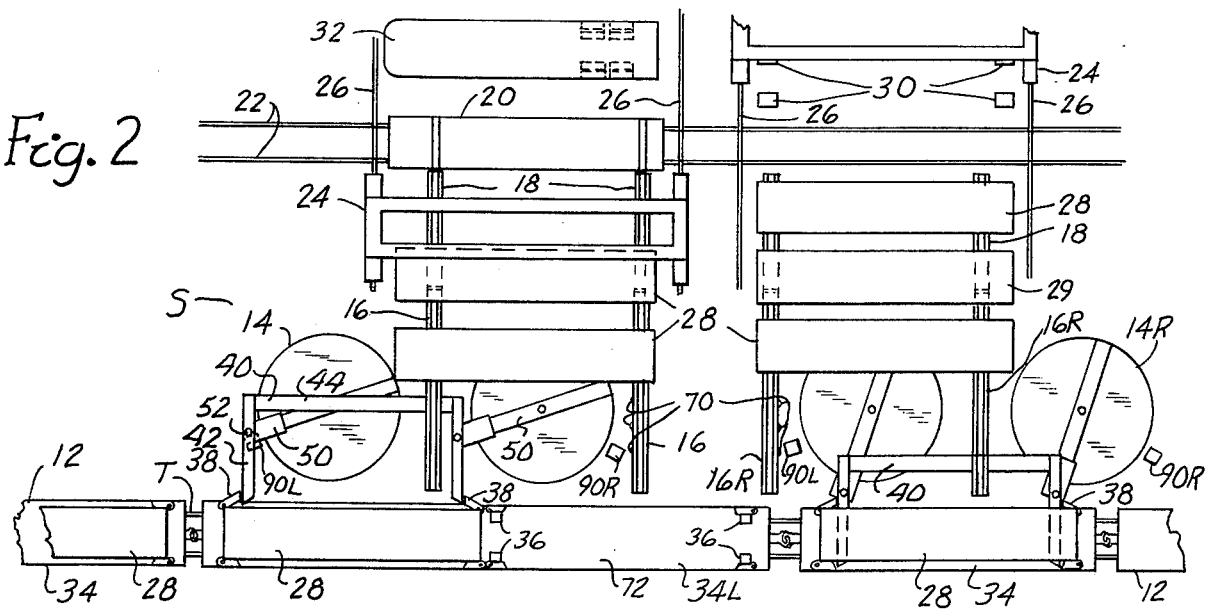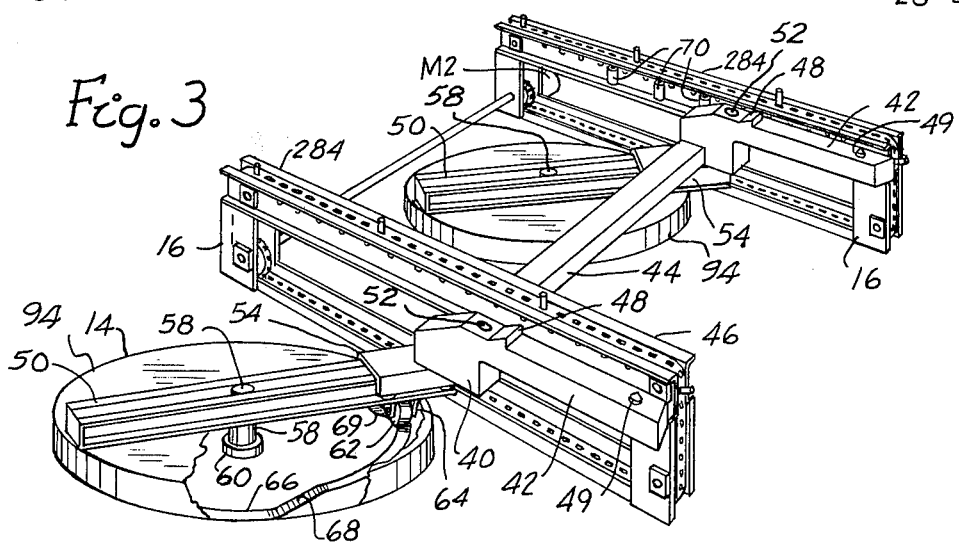

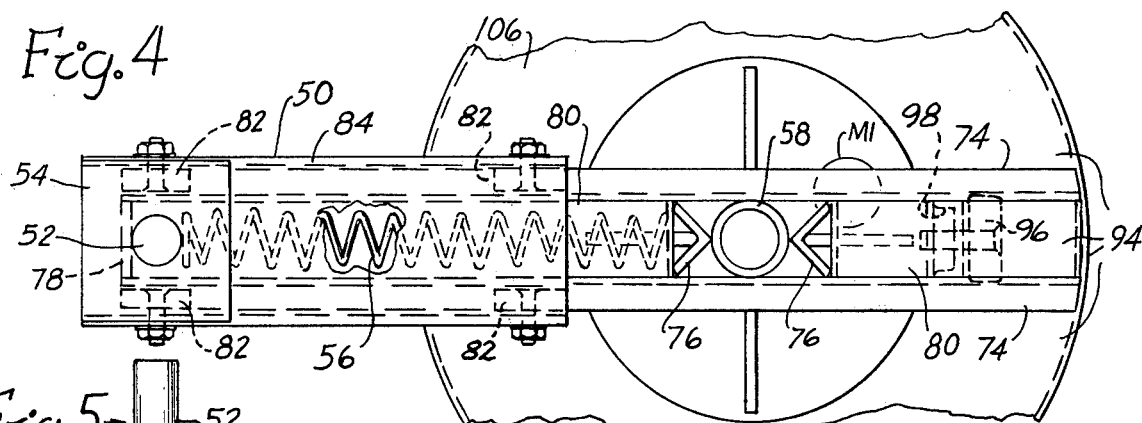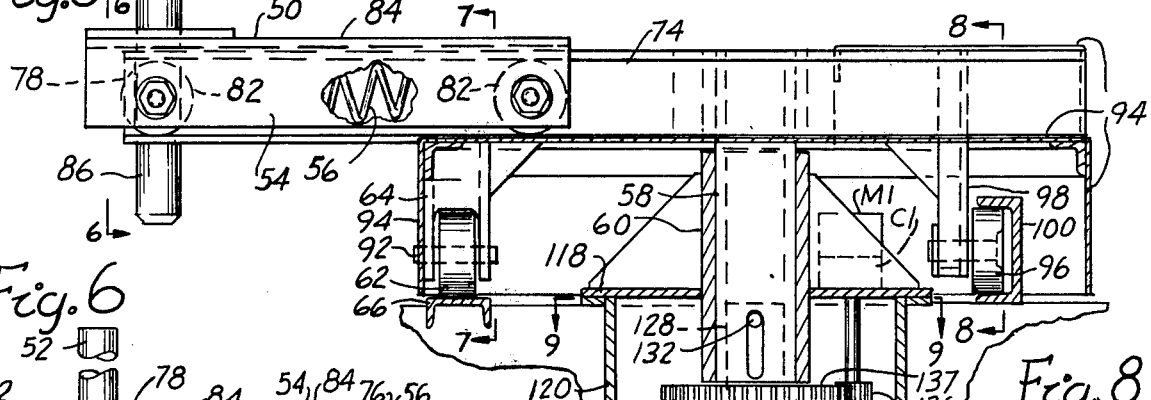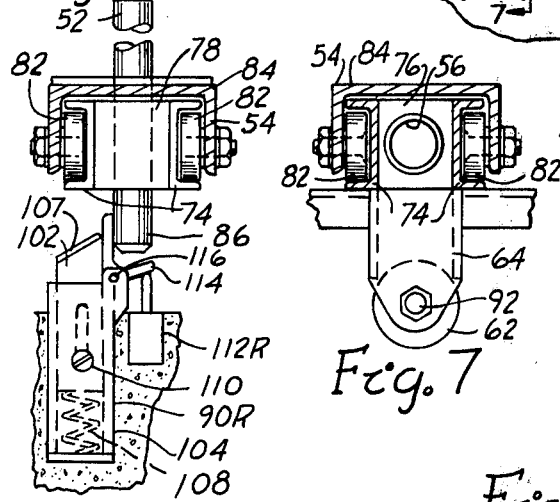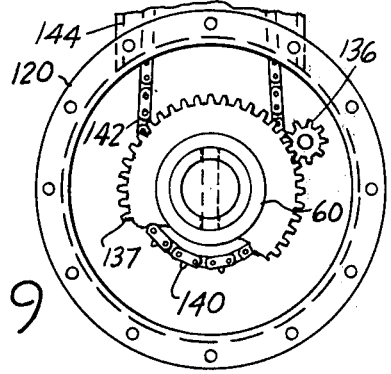

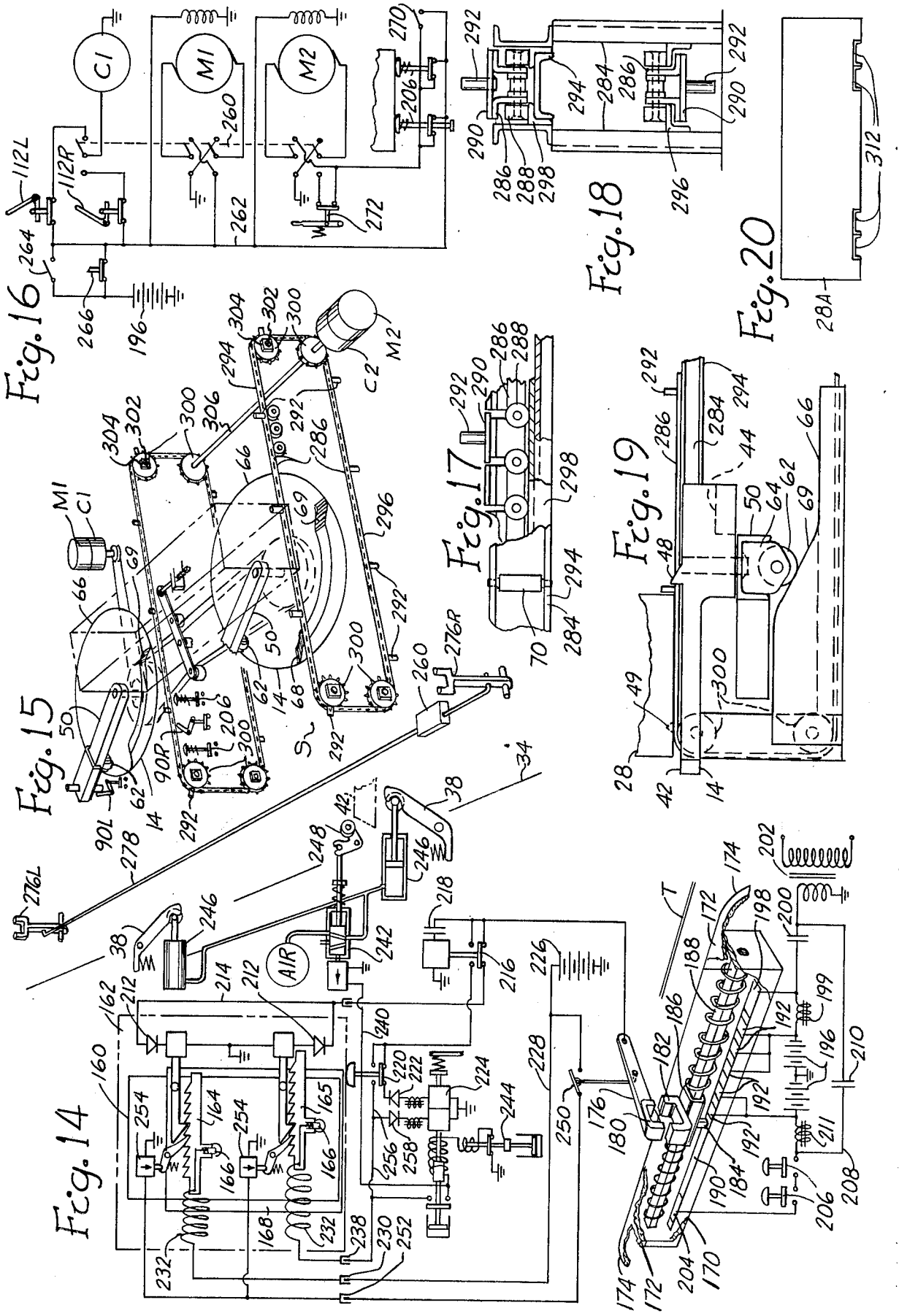

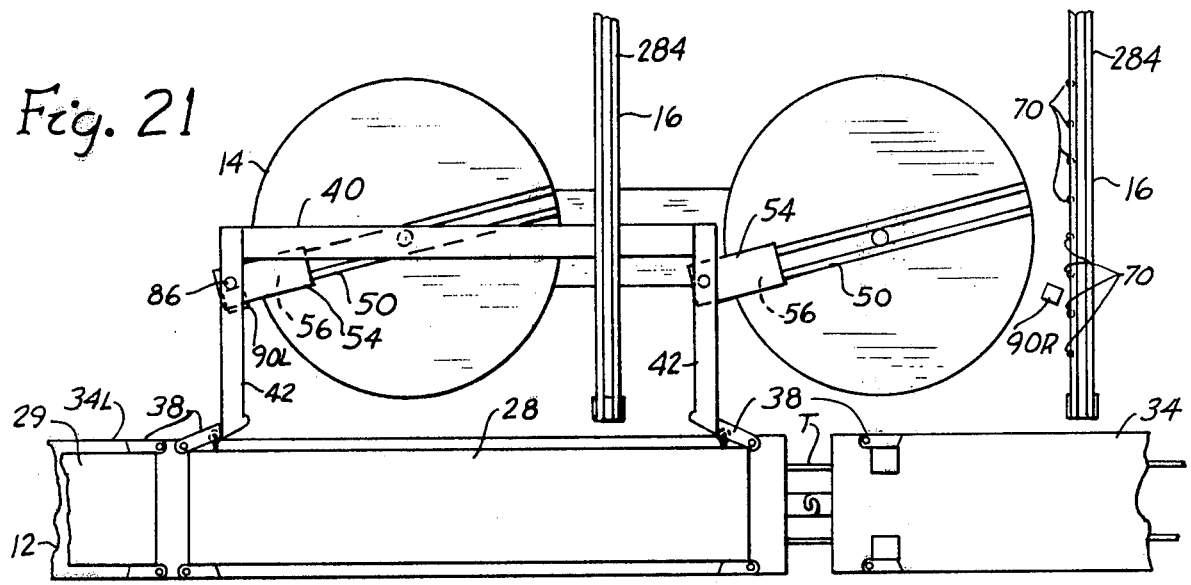
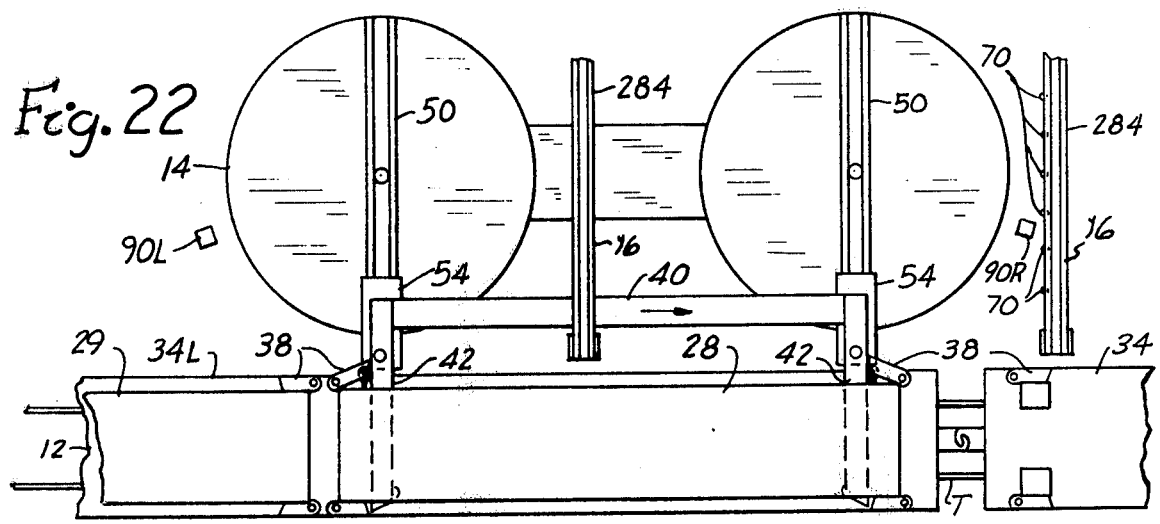
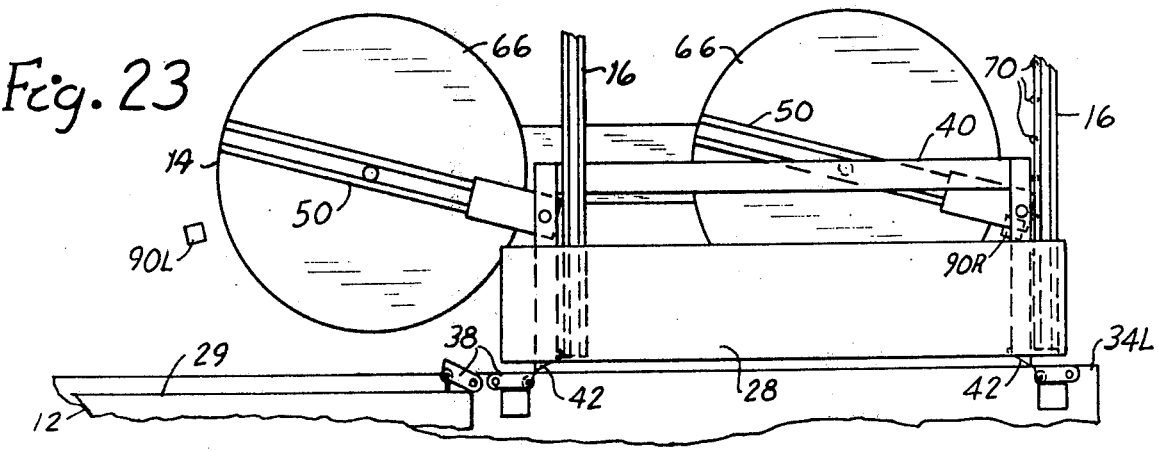
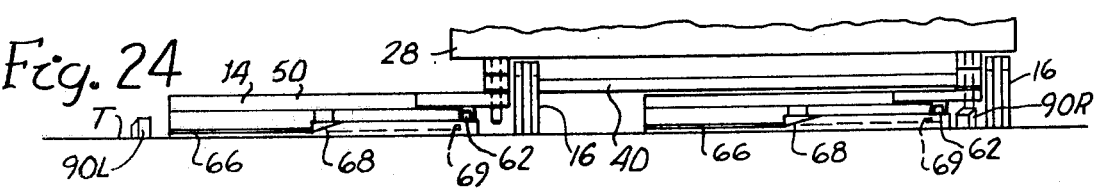

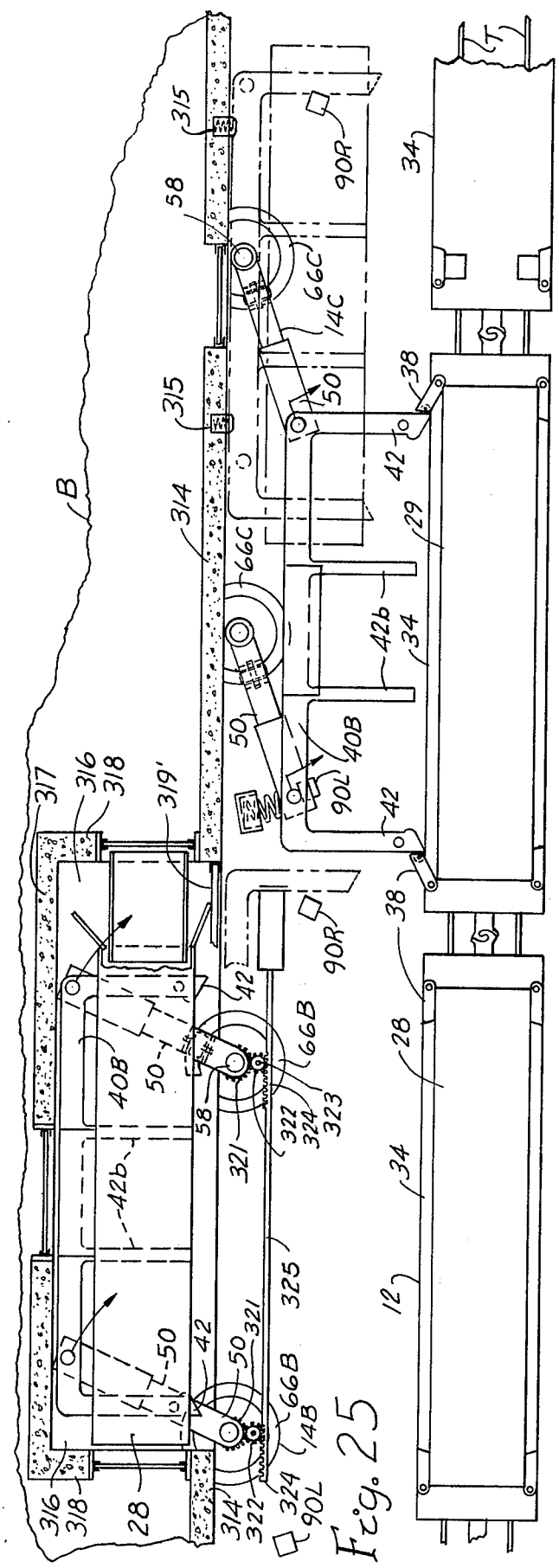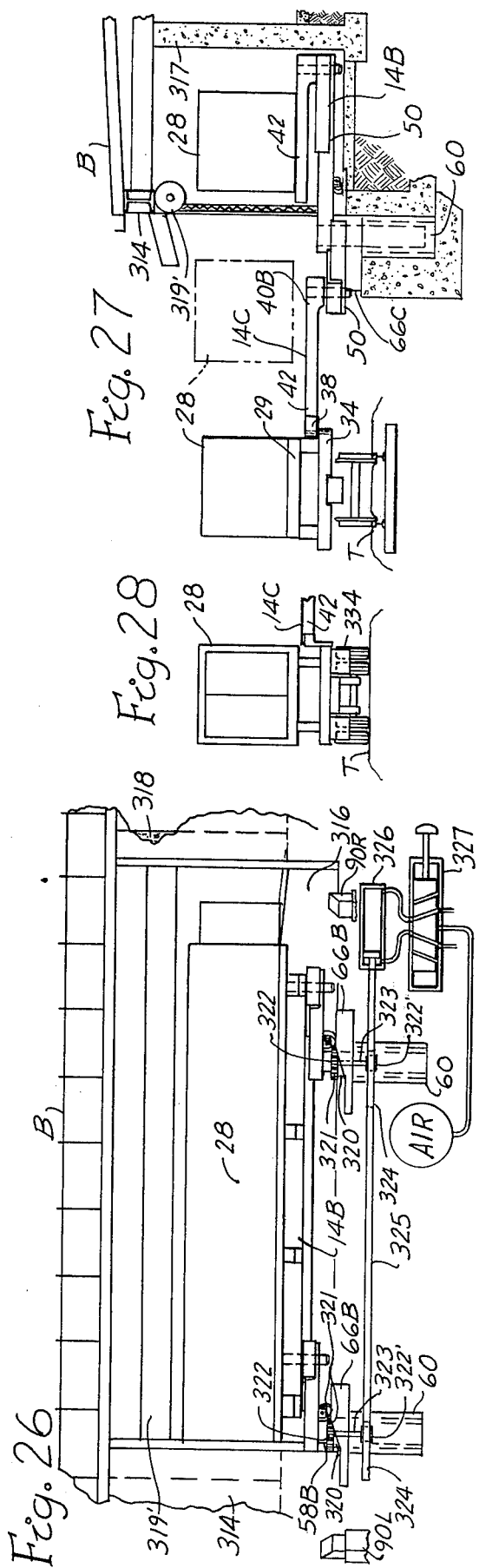

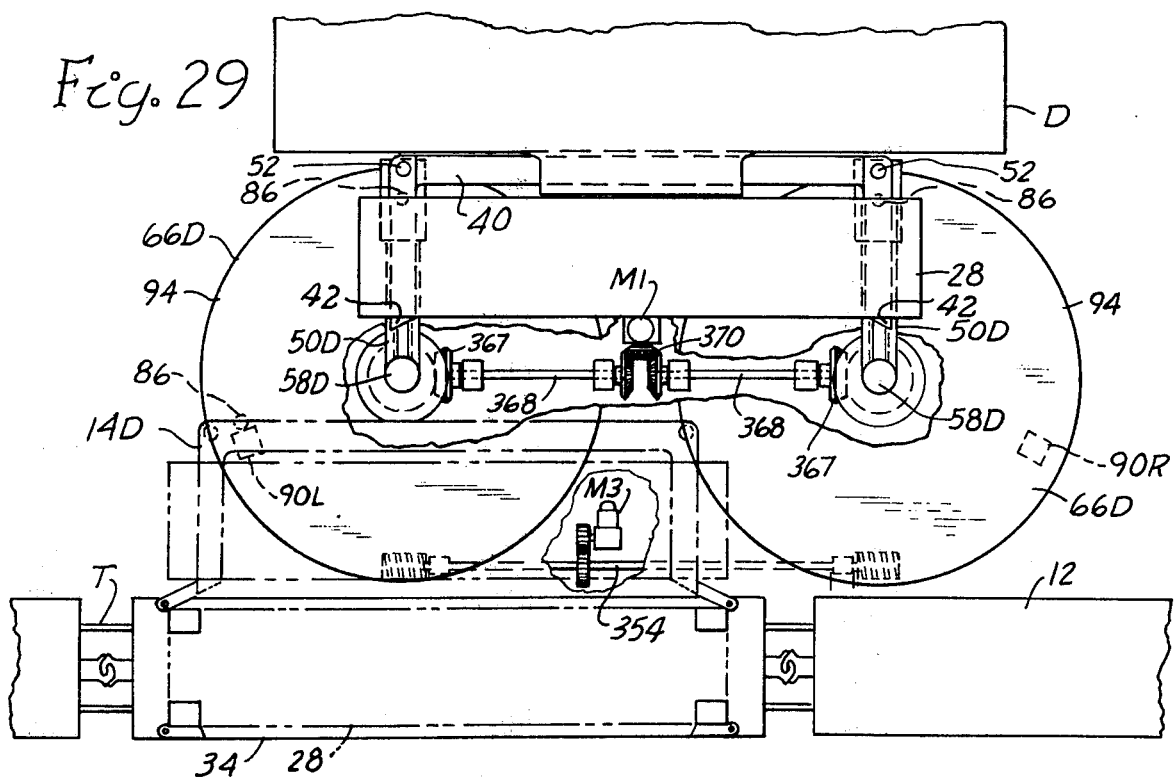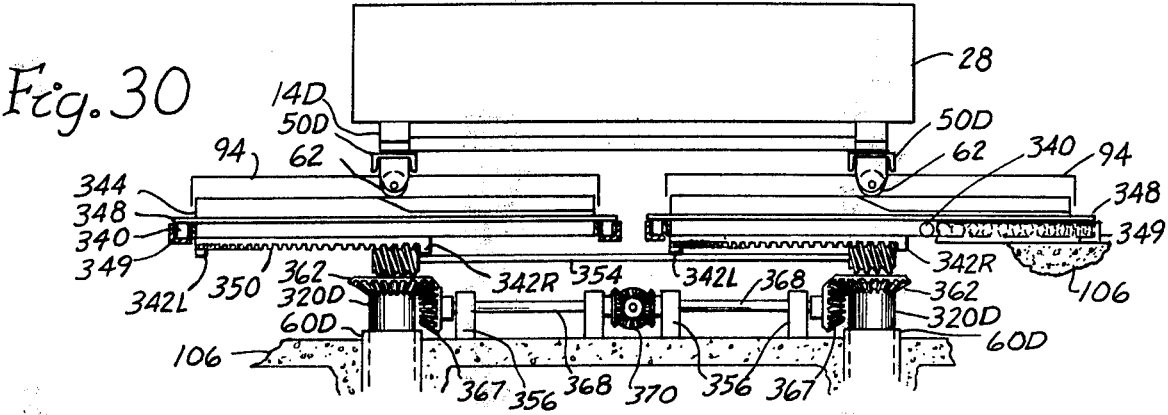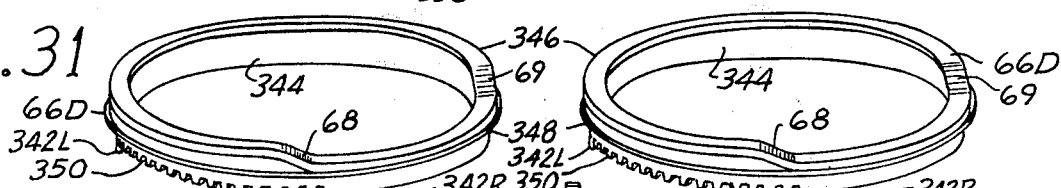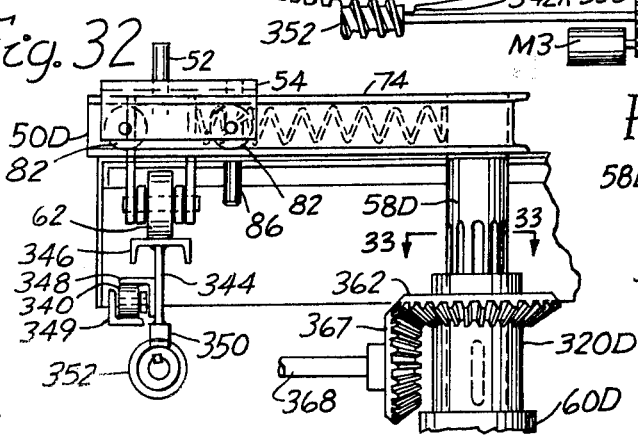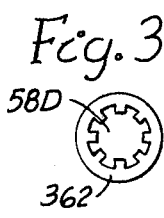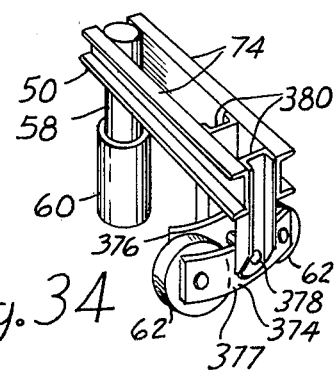

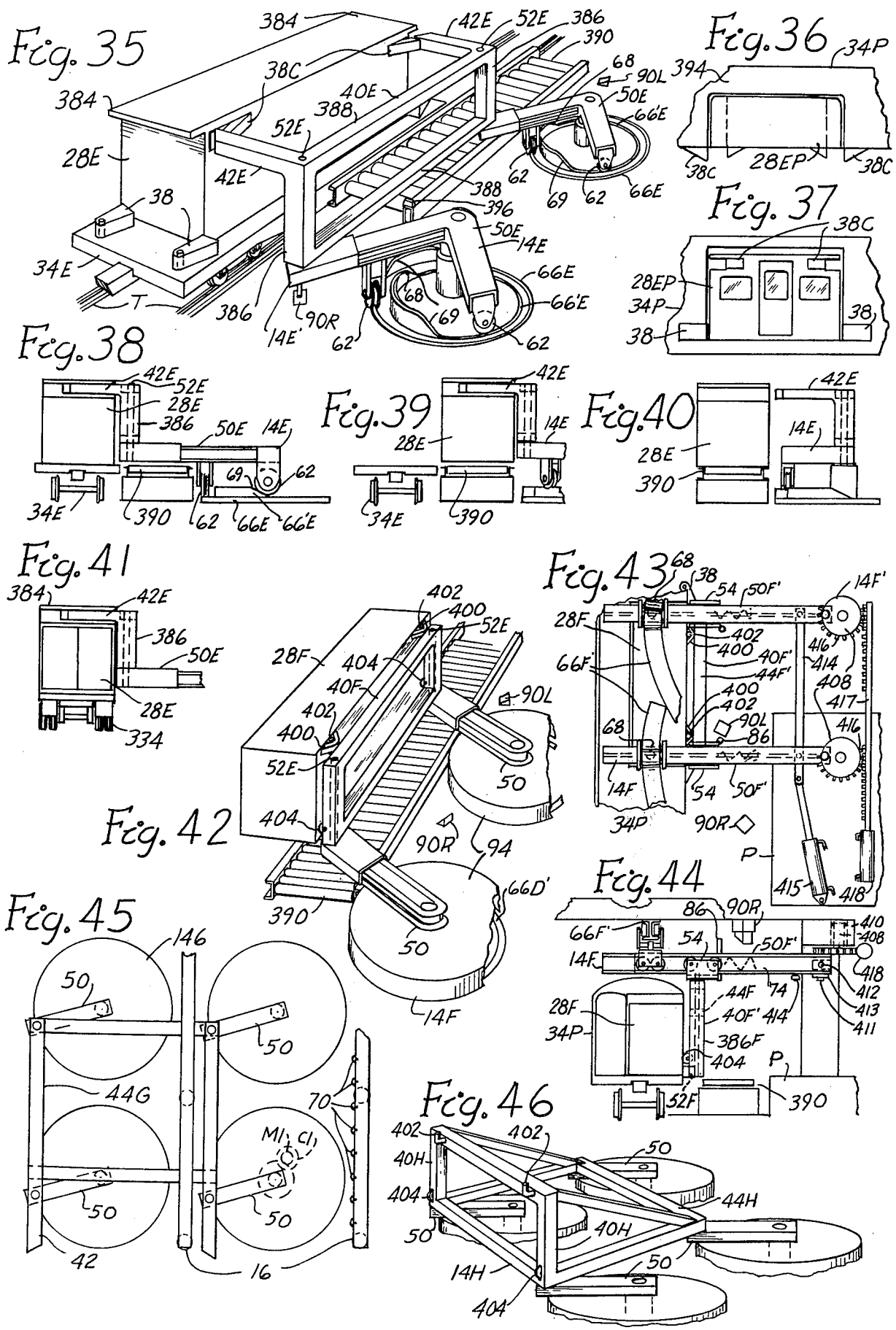

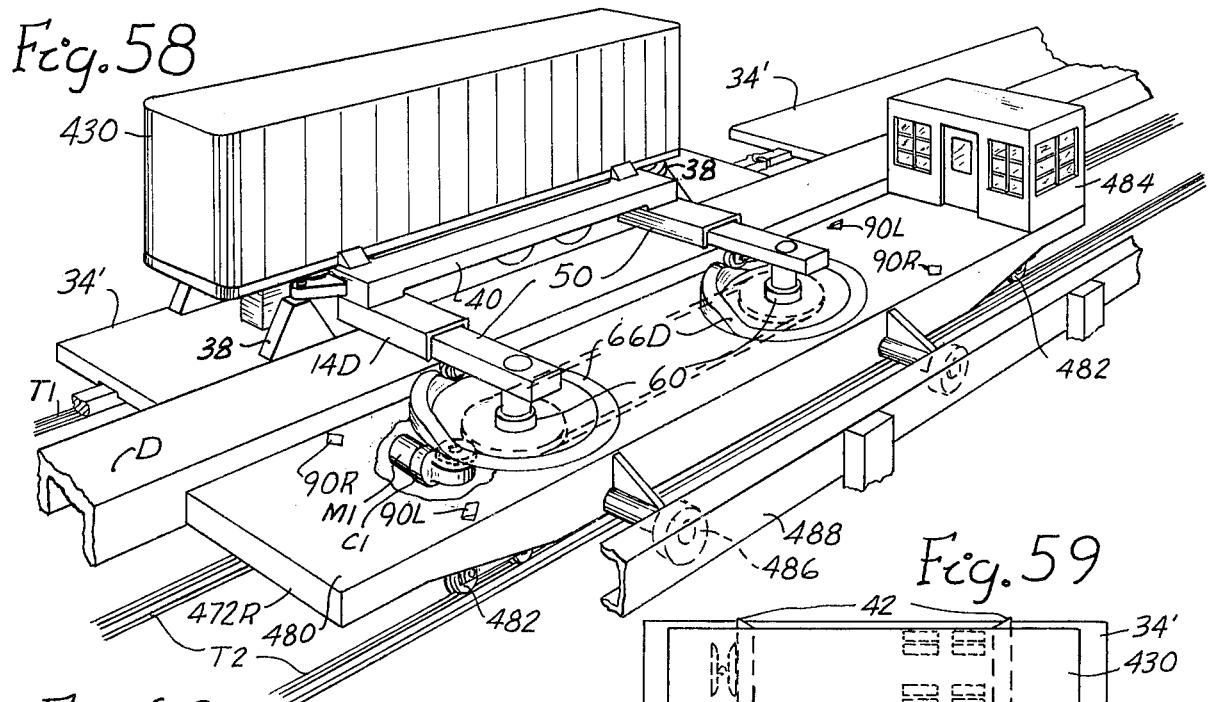
Fig. 58
Fig. 59
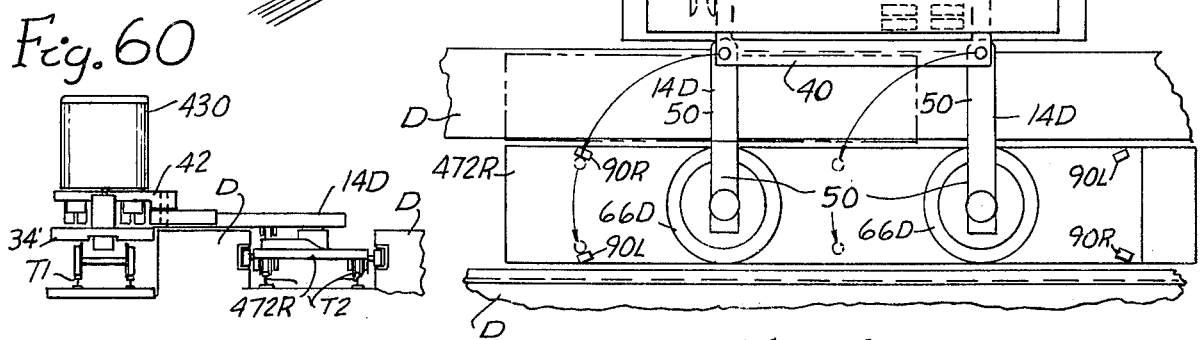
Fig. 60
Fig. 61
Fig. 62
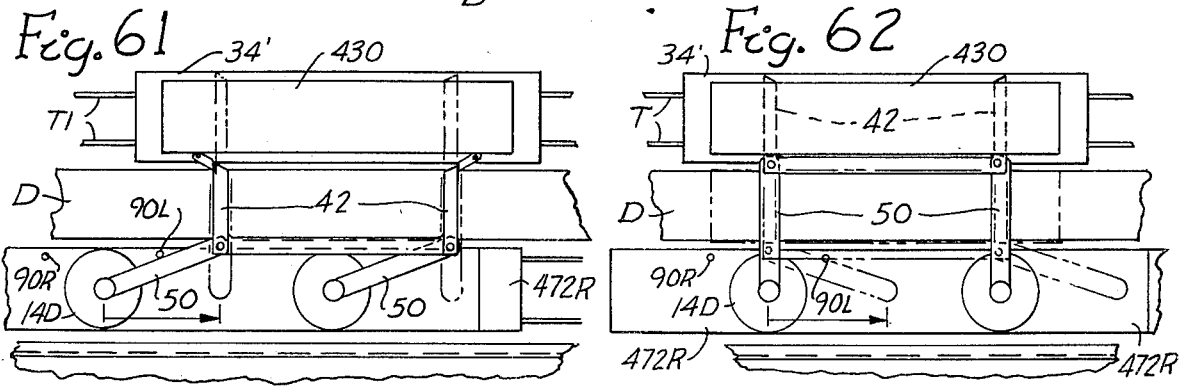
Fig. 63
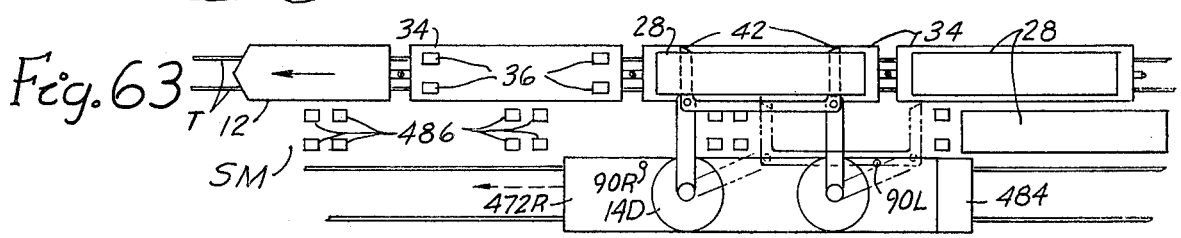
Fig. 64
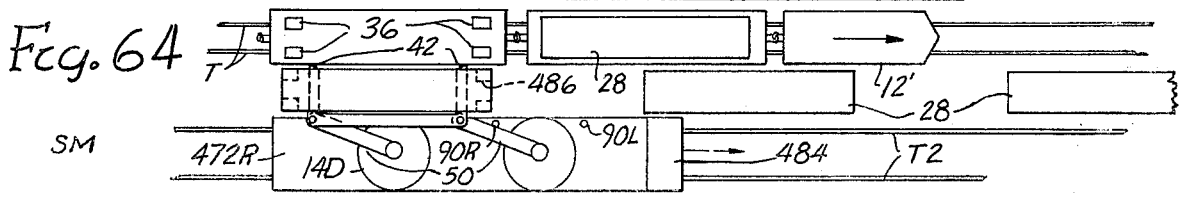

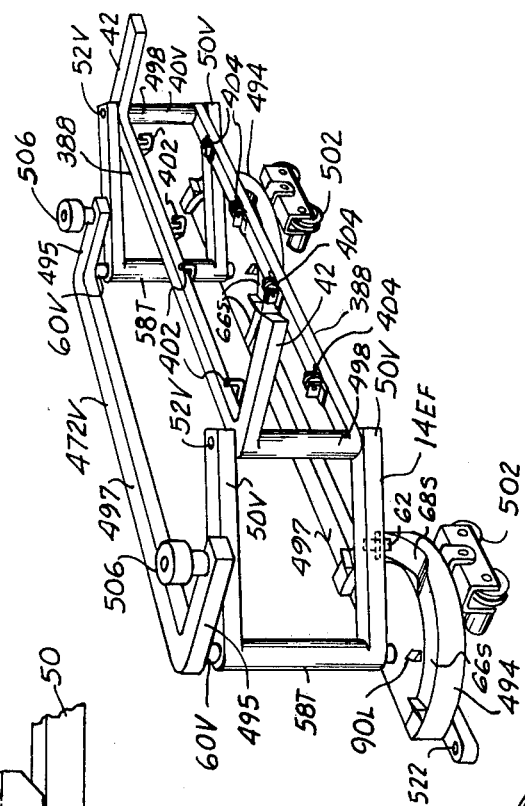
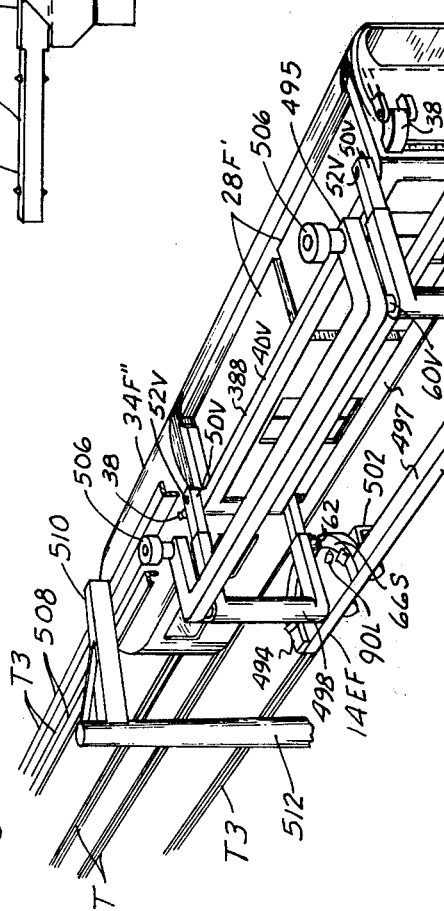
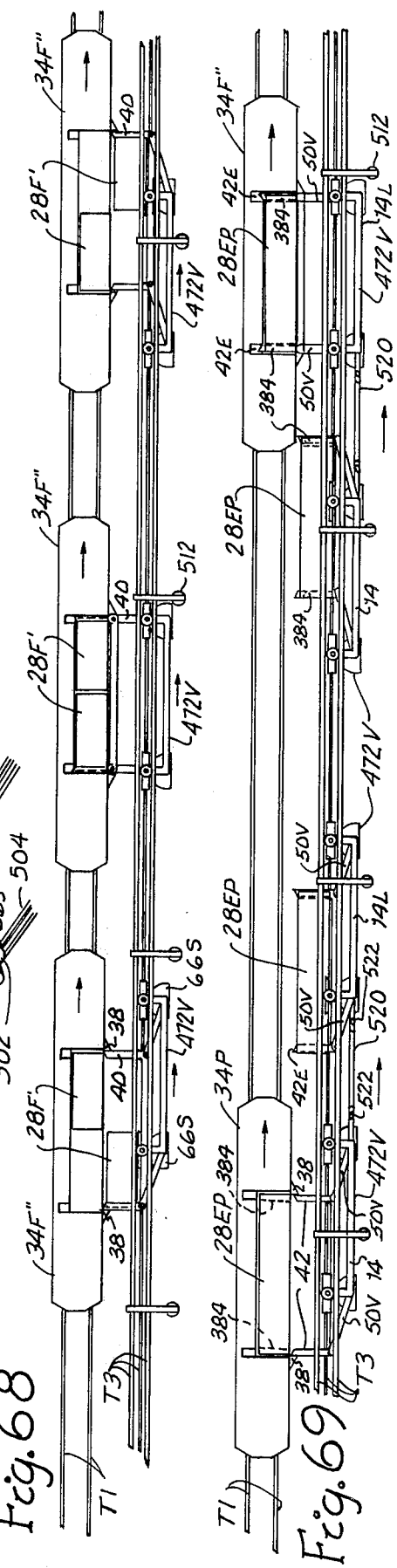

LOADER AND STORAGE SYSTEM

CROSS REFERENCE TO RELATED APPLICATIONS

This application is related to application Ser. No. 428,973, filed Dec. 12, 1973, abandoned in favor of Ser. No. 591,101, filed June 27, 1975, now U.S. Pat. No. 4,065,006, and in related to application Ser. No. 528,948, filed Dec. 2, 1974, now abandoned in favor of Ser. No. 741,680, filed Nov. 15, 1976. This also relates in parts to several of my earlier patents some of which are mentioned hereinafter.

My prior transfer systems required successive transfer vehicles for loading or unloading successive cars in a train and considerable station track and land for a station to handle more than a few containers. This invention overcomes these limitations of my prior loaders by providing one loader capable of unloading successive container cars on a train moving slowly by. The loader frame is mounted on rotary arms as a link between the arms forming therewith a parallelogram, the load forks extending from one side of and above the link so the arms can rotate to translate the frame substantially in a circle. The arms are telescoping and resiliently held extended. This takes up coupling shock when a train moving by has a car which extends side coupling latches that engage the forks to swing them parallel under a load supported on pedestals on the car. The arms are each supported on a circular track which lifts the arms which lift the forks to lift off the load from the vehicle before the arms are rotated out from the vehicle to carry the load from the vehicle. The track then lowers the arms to set the load on parallel roller chain conveyor runs which are moved by the load being pushed against pins or dogs on the conveyor to hold the load at right angles to the conveyor as it is set thereon. The conveyor then carries the load back parallel to be ready for receiving the next load when the loader arms make the next revolution. In reverse, the conveyor feeds each load to a position for the forks to engage locators and lift the load from the conveyor and stop in a position for coupling by an empty vehicle moving in the direction opposite to that for unloading.

It is an object to reduce the length of the station track of my prior loaders to about half the length of the transfer vehicle, so the track for each wheel unit can be kept separate without the wheels crossing tracks, with each corner of the transfer vehicle on a separate truck or wheel unit; to simplify the station track and movements around the station track, to provide means for returning the loader to the starting position so it can be reused to unload a plurality of cars in a train moving by the station; to further simplify the tracks by making the run for each wheel unit circular and guiding the supporting wheels and moving them from an arm whose pivot is concentric with the track to eliminate need to guide grooved wheels around sharp curves and to reduce friction. Further objects are to mount the load transfer frame on parallel crank arms supported at outer ends on wheels on the track concentric about the crankshaft to reduce the force required to move the transfer device further, to provide this parallelogram linkage to better maintain parallel alignment and to eliminate a counterweight to reduce mass of the loader to be more responsive to start when coupled to a vehicle, to reduce coupling shock, to reduce cost of installation and operation, to power assist the arms to assist the transfer and return to starting position after each transfer or to rotate in the opposite direction to load for transfer and stop at the opposite end of the transfer run, to provide stop latches to hold the loader in coupling position after each revolution until coupled for next transfer or reversed, to release the loader automatically when coupled for transfer, to provide controls to prevent coupling of the loader if the speed of the train is too high for safe transfer, to provide resilient telescoping mounting of the fork frame on the arms to cushion coupling and move a holding pin out from behind the stop latch so the loader can start when coupled, to provide coupling forks which remain parallel with resilient coupling so they can have locators to carry a load in alignment for transfer, to provide bumpers which telescope the arms to hold the load frame in line during the setting down and picking up of loads to provide accurate alignment during transfer, to prevent or reduce skidding during engagement and setting down of loads, to provide covers for the station tracks and drive system to protect from weather etc.

Some other and further objects of this invention include: to provide a loader cheap enough to use for storing a container thereon until unloaded or loaded at factories or warehouses to replace the siding, to provide a way to unload and load loaders as fast as they can load or unload a train moving by, to reduce the size of the station for a given capacity, to provide a cheaper automatic transfer device which has greater utility and can serve to unload all the containers for a given station or industry without need for several to operate in succession on the same track, to provide controls for selective transfer to or from any or all successive cars in a moving train with only one loader and means for unloading or loading the loader nonstop between each transfer with the train to handle all the loading or unloading of a train passing the station, to eliminate hump yards, to provide a reversible loader to load or unload a train or other vehicle in either direction, to provide a simple station for both unloading and reloading a train while moving by, to adapt this loader to handle various types of passenger and freight containers, pallets, trailers, etc.; to better utilize the loader and railway cars, fuel, land, and equipment and provide better and faster service for shippers; to mount the loader on a vehicle to actuate it by movement of the vehicle when the loader is side coupled to a standing or moving load or vehicle, to mount the loader on a turntable to turn loads at right angles for convenient storage and to conserve space, to provide a loader to cover the full range of transfer from a large station to a small industry, to replace sidings and to reduce or eliminate wayfreight switching, to reduce railroad operating cost and increase utilization of cars and equipment, to make branch lines profitable, to apply this loader to rapid transit and passenger trains, to enable transfer between vehicles running at a speed difference, and to adapt the loader to amusement devices, to material handling, and for a toy of small or large scale this loader is ready.

These and other and further objects and features are attainable with this invention and should be obvious from study of this specification by those skilled in the related arts or will be pointed out herein with reference to the drawings wherein:

FIG. 1 is a perspective view from the back of a rotary transfer station along a railway showing a train moving in either direction by the station while being unloaded and reloaded thereby.

FIG. 2 is a plan view of this station seen from the railroad front with same train moving by.

FIG. 3 is a perspective of the rotary parallelogram loader with a cooperating double chain conveyor rack at the station.

FIGS. 4 and 5 are top and side views of a transfer crank arm of the loader.

Figure 47:
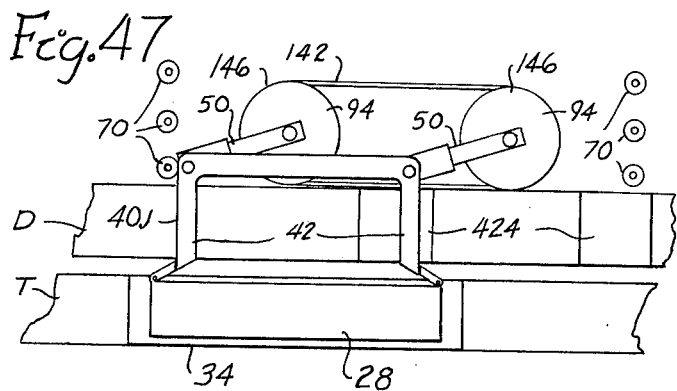

FIGS. 6, 7, 8, and 9 are sections on respectively lines 6—6, 7—7, 8—8, and 9—9 of FIG. 5.

FIG. 10 is a perspective of a cushioning carriage for mounting on the outer end of each arm of the loader and stopped by a latch stop.

FIG. 11 is a schematic plan of the preferred coordinating drive for the crank arms of the loader.

FIG. 12 is a side elevation of a variation of the crank arm.

FIG. 13 is a schematic plan of an alternative drive for the crank arms.

FIG. 14 is a schematic of controls between the track, car, and container to extend the car side couplers for transfer at the station.

FIG. 15 is a schematic perspective of the drive and control points for the loader and station rack conveyor.

FIG. 16 is a schematic of circuits for the loader and conveyor.

FIGS. 17 and 18 are side and end views of a portion of the station conveyor.

FIG. 19 is a side elevation of the fork loader setting a load on the station conveyor.

FIG. 20 is a side view of a modified container.

FIGS. 21, 22, and 23 are plan views of the left-hand loader transferring a load from the train to the cooperating conveyor at the station, the views being in aligned sequence.

FIG. 24 is a front elevation of the station corresponding to FIG. 23.

FIGS. 25 and 26 are a plan and a partial side elevation of horizontal parallelogram loaders replacing a siding to a factory or warehouse along a railroad.

FIG. 27 is an end view of FIG. 25.

FIG. 28 is a variation of a portion of FIG. 27.

FIGS. 29 and 30 are respectively schematic plan and front views of a variation of the loader having track loops mounted to be shifted to enable the loader to load or unload cars in a train moving in either direction.

FIG. 31 is a schematic perspective of the rotary track loops of this loader.

FIG. 32 is an elevation view of the crank arm of this loader and its swivel column and its wheel unit on a section of its rotary track loop.

FIG. 33 is a section on line 33—33 of FIG. 32 to larger scale.

FIG. 34 is a perspective of a portion of a crank arm supported on a two-wheeled truck.

FIG. 35 is a perspective view of a variation of the loader transfering a container between a railway car and a roller conveyor.

FIGS. 36 and 37 are plan and side views of a portion of a railway passenger-type car with a container therein for transfer by a loader of the type shown in FIG. 35.

FIGS. 38–40 are end views of the loader of FIG. 35 in sequence unloading the railway car.

FIG. 41 is a partial end view of this loader engaging a container for transfer from a truck bed.

FIG. 42 is a perspective of a variation of the loader having a vertical frame hooking to the side of a container to set it on the roller conveyor.

FIGS. 43 and 44 are plan and end views of a station with a variation of the side hooking parallelogram loader engaging a passenger type container on a railway passenger car for transfer to or from the station.

FIG. 45 is a plan of a variation of the loader with a rectangular linkage fork-lift frame on four crank arms to better support the forks.

FIG. 46 is a perspective of a four arm loader with a vertical hook or fork frame braced integral on a rectangular linkage frame.

Figure 48:
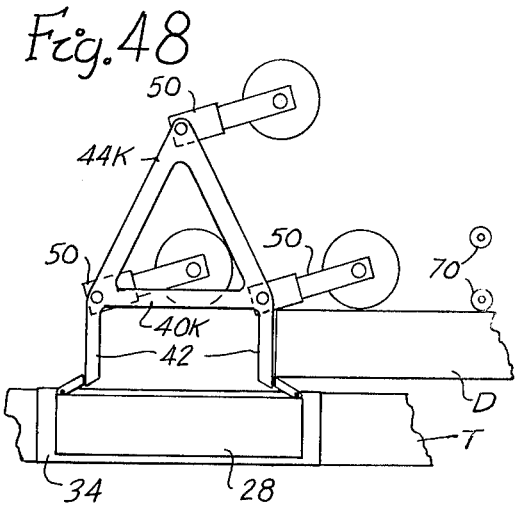
Figure 49:
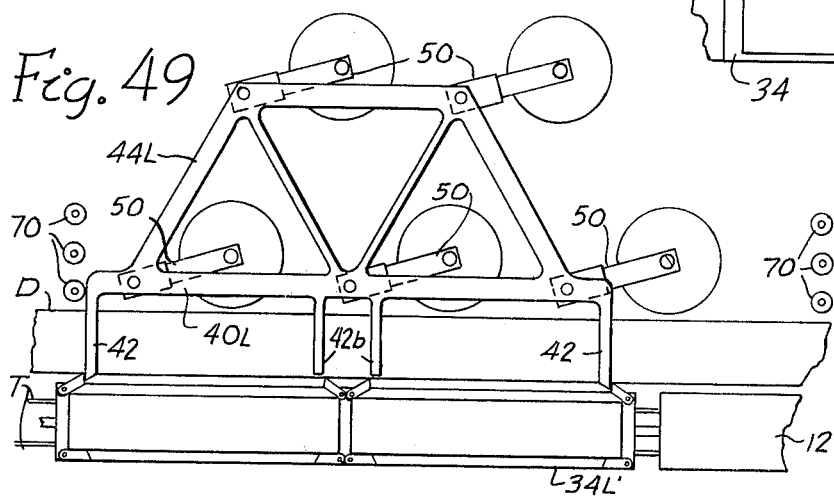

FIGS. 47, 48, and 49 are plan views of respectively a two-arm, three-arm, and five-arm fork loader engaging loads for transfer between parallel ways. In these Figures the loads can be semitrailers for transfer between railway car and driveway.

Figure 50:
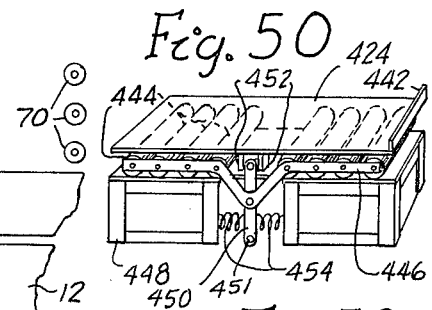

FIG. 50 is a perspective of a roller-mounted slip-plate for mounting in the driveway for transverse slip for preventing trailer wheel side skid where trailers are set down and lifted by the loader.

Figure 51:
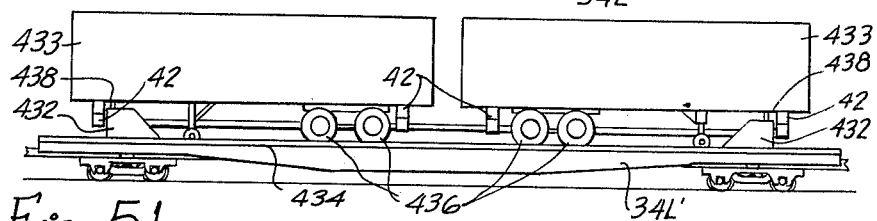
Figure 52:
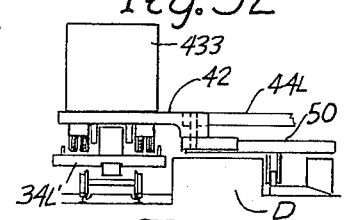

FIGS. 51 and 52 are side and end elevations of semitrailers on a railway car engaged by the loader of FIG. 49 to larger scale.

Figure 53:
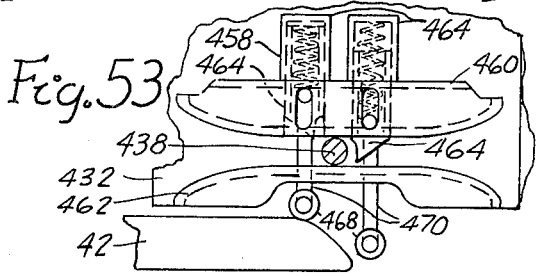
Figure 54:
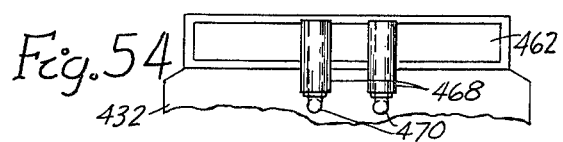

FIGS. 53 and 54 are plan and side views of an automatic fifth-wheel release operated by the lift fork.

Figure 55:
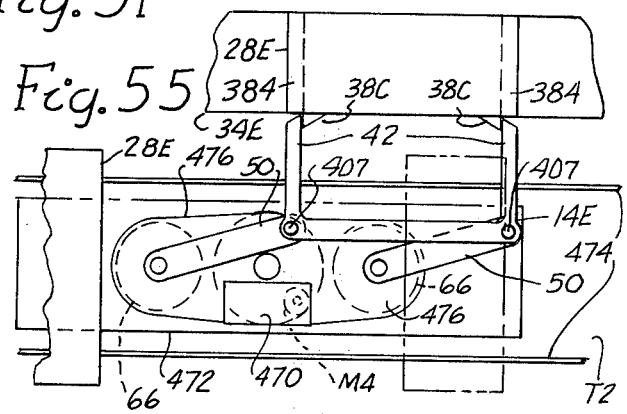
Figure 56:
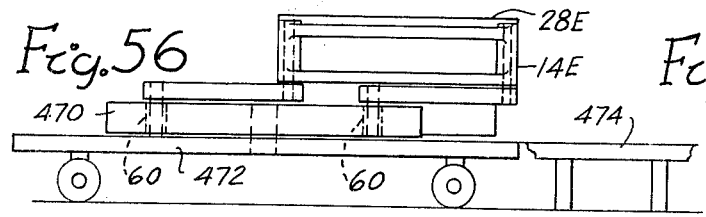
Figure 57:
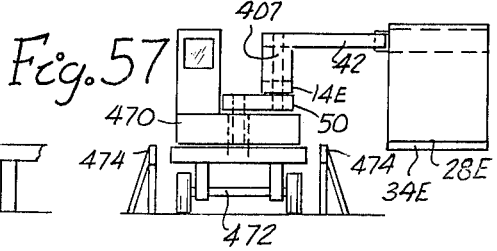

FIGS. 55–57 are respectively plan, side, and end views of a vehicle having a rotary mounted loader engaging a container for rotation 90° and transfer between parallel storage rails and a transport vehicle.

FIGS. 58–60 are respectively perspective, end, and plan views of a variation of the loader mounted on a railway vehicle and transferring a semitrailer between a railway car and a driveway.

FIGS. 61–64 are plan views of a vehicle mounted loader transferring a trailer.

FIG. 61 shows the loader moving left to right engaging and lifting the trailer off a standing railway car.

FIG. 62 shows the loader setting the trailer on the parallel driveway.

FIG. 63 shows the loader unloading the train moving from right to left.

FIG. 64 shows the loader loading a train moving from left to right.

FIG. 65 is a perspective of a variation of the fork frame having reversible forks.

FIG. 66 is a perspective of a railway with the loader on a transfer car on a bicycle track transferring one container to and one from a train.

FIG. 67 is a perspective of the loader station car from the transfer side.

FIG. 68 is a plan of a transfer run along a subway with the carriers of FIG. 66–67 in successive positions making the double transfer.

FIG. 69 is a plan of a transfer run along a railway with two coupled loader cars of FIGS. 66–67 transferring a container out of a train and replacing it with another.

Referring to the drawings and in particular to FIGS. 1 and 2, train 12 on track T can be passing unload-load station S in either direction at slow speed for automatic unloading and reloading. Station S for a large transfer point has a left-hand and a right-hand parallelogram loader respectively 14 and 14R equally spaced from a side of track T,. Two roller-chain conveyor racks 16 and 16R at right angles to track T extending back respectively from loader 14 and 14R a short ways each followed in line by a conveyor 18, and in FIG. 2 by a transfer car 20 on track 22 connecting conveyors 18 for each loader. The station also has one or more overhead or gantry cranes 24 on rails 26 for moving containers 28 or pallets 29 between the conveyors 18 and storage pedestals 30,. Flat bed trailers 32 or other vehicles positioned under a crane 24, or any suitable container handling equipment can be used around the station to unload and load the conveyors for each train.

Train 12 includes cars 34 and 34L with pedestals 36 for holding respectively one or two 40-foot containers 28 or pallets 29. Some of these cars are loaded; some (34L) may be half loaded; some empty. The cars have side coupling latches 38 preferably as in my patent application Ser. No. 741,680, FIGS. 6, 7, and 19-23, on each side below each end of each container spot or berth. Containers on the train and routed to the station are removed by the first loader 14 or 14R as the cars enter the station and are set down side by side on its roller-chain conveyor 16 or 16R. Loads for the train are spaced apart side by side respectively on conveyors 16 or 16R and the exit end of the station before the train arrives. The second loader 14 or 14R feeds the load one at a time to empty cars 34 or 34L as they exit from the station and utilize spaces emptied by the first loader. Loaders 14 and 14R are the mirror image of each other and feed loads to conveyor 16 and from conveyor 16R respectively if the train is moving to the right in FIG. 2 or vice-versa if the train is moving to the left.

Referring to FIG. 3, each loader has a fork frame 40 with parallel coupling fork arms 42 at opposite ends connected by an integral link 44 below the forks for the link to clear under a top run 46 of conveyor 16 with the forks extending above the conveyor when moved back from track T. Each fork 42 has an aligned locating step or tab 48 to engage the side of the container or pallet facing the loader and shorter locating cones 49 to align the load on the forks before lifting. The fork frame is supported above two or more horizontal parallel and equal crank arms 50. The frame is sleeve mounted on the vertical crank pins 52 each on a cushioned carriage 54 mounted on arm 50 to resiliently roll or slide along the arm against a large compression spring 56. Arms 50 each have a crank shaft 58 mounted to turn and slide up and down in a vertical supported column 60 and are each supported on a wheel 62 mounted on a bracket 64 depending from the arm 50 so wheel 62 is on the axis radial from the crank shaft preferably at the outer crank-pin end. Wheel 62 runs on a circular track 66 having incline 68 where closest to track T and decline 69 closest along conveyor 16 to lift the fork frame for lifted swing along a plateau of nearly 90° of rotation therebetween. Bump rollers 70 along inner runs of conveyors 16 and 16R engage the outer side of fork arms 42 of the loader to hold them parallel along the conveyor run when the forks are lifted and lowered along incline 69. The fork frame preferably engages the railway car to move carriages 54 back along arms 50 holding the forks 42 aligned with the car when lifting or lowering to transfer a load straight vertically with respect to the car as wheels 62 run inclines 68. The loader forks 42 extend the loads to or from the train while arms 50 are lifted by wheels 62 on tracks 66 and retract when empty or enter under the load on a lower level with clearance in a space provided by pedestals 36 below the bottom of the container and top of the car floor 72 when wheels 62 are on the low portion of their tracks 66.

Referring to FIGS. 4-10, the preferred crank arms 50 have two parallel aligned channels 74 with their backs secured against vertical crank shaft 58 at right angles by welding to angles 76. The channels are further connected by front plate 78 and spacing plates 80 to form a track for wheels 82 of the crank-pin carriage 54. Carriage 54 has a channel 84 turned legs down over channels 74 and wheels 82 mounted along in facing sides of the legs of channel 84 to run in channels 74 between end plate 78 and shaft 58. The crank pin 52 is a vertical shaft secured through a hole in the top of channel 84 and extends down between and below channels 74 to form a latch pin 86 having a chamfered end to latch with latch stops 90L and 90R at respectively the left and right-hand coupling positions for the crank arms. Spring 56, enclosed between channels 74 by cover plates 80, extends the crankpin out to end plate 78. Arm 50 is supported by wheel 62 on shaft 92 through sides of vertical rectangular tubing 64 depending from channels 74 preferably at or near the outer end of either side of stop pin 86. Channels 74 extend beyond the crank shaft to support a circular cover 94 over the run of wheel 62 and a wheel 96 secured on channel 98 depending from between channels 74. Wheel 96 is also mounted on an axis radial from shaft 58 and runs in a channel track 100 to help lift and lower the arm 50.

Referring to FIGS. 6 and 10, latch stops 90L and 90R are similar and each includes a vertical square tube 102 mounted to slide up and down in a square tube 104 secured in concrete base 106. Tube 102 has a tapered top end covered by plate 107 and is lifted by spring 108 in tube 104 to a height set by screw 110 in slot tube 102 to latch with pin 86. Limit switches 112L and 112R respectively at stop 90L and 90R have their box in base 106 and an angle lever 114 pivoted at its apex on pin 116 to be lifted by the stop pin 86 only when engaged against stop 90L or 90R from behind and to recess to let pin 86 pass when the stop recesses to let the pin pass.

Shaft 58, a tube, slip fits in vertical tube 60 secured through a hole in the center of cover 118 bolted to box 120 embedded in concrete base 106. Box 120, of steel pipe 122 welded to bottom plate 124, has a tube 126 secured central on top of plate 124 holding a drive shaft 128 in thrust bearing 130 in tube 126. Shaft 128 extends up to slip fit in tube 58 and is connected by pin 132 in shaft 128 through a slot in tube 58 so tube 58 can move up and down. Shaft 128 is held down on bearing 130 by screw 134 through tube 126 entering a groove around shaft 128. Shaft 128 is driven by spurgear-reduction motor M1 connected through a magnetic clutch C1 and spur gears 136-137.

To keep arms 50 parallel through dead centers, a sprocket 140 is secured on each drive shaft 128 for driving each arm and connected by roller chain 142. Chain 142 is run through a trench 144 below ground, FIG. 11, and is tightened equally on each run by two horizontal sprockets 146 riding outer sides of opposite runs of the chain and secured to rotate on double lever bar 148 on vertical pins equidistant from a vertical pivot pin 150 through the bar. Bar 148 is turned by takeup screw 152 to take up slack in both runs of chain 142 to keep arms 50 of the loader parallel through dead centers.

Track 66 is made of a channel turned legs down for wheel 62 to run on top and is embedded in concrete base 106 along with box 120, trench 144 and stops 90L and 90R.

Referring to FIGS. 12 and 13 for a variation of the crank arms 50 and drive between, especially suited for minature sizes, crank arm 50b is made of two interfitting square tubes, outer one 156 and inner one 157, with crankpin 52 secured in the outer one through a slot in the inner one with spring 56 between crankshaft 58 and pin 52 in the tubes. Wheel 62 is mounted on pin 92' through shaft 58 for light loads, and shafts 58 connected by drive chain 142 or belt about respectively a sprocket or grooved ring 146' secured around each track cover 94, FIG. 13. Track 66 for wheel 62 can be a section of pipe. Gearing and shafting between shafts 58 could optionally be used as described with FIGS. 29-33.

ELECTRICAL CIRCUITS

Side coupling latches 38 are preferably controlled by a routing card 160 in a reader 162 as in my U.S. Pat. No. 3,483,829, FIGS. 17-26, to extend for latching the forks of an empty loader to remove a container routed to the station by punched holes in the card. Circuits of FIG. 14 show a modification where two ratchet steppers 164 and 165 each move a brush 166 over routing card 160 to positions which together represent the station S being passed. Card 160 of paper or plastic only completes a circuit through conductive spots or holes therethrough connected by conductive face plate 168 in back of the card to represent the station at which the container is to be transferred off the train.

A signal box 170 for identifying the station and requirements for transfer is located along track T where couplers 38 are to be extended from the cars for transfer. Box 170 has a nonmagnetic cover 172 with contact rail 174 insulated from the rest of the box located along track T to be engaged by a contact shoe 176 for each container span between couplers 38 on cars 34 and 34L. Shoe 176 has a permanent magnet 180 thereon to align a permanent magnet 182 mounted to be moved along in box 170 by magnet 180 to send a signal to the car. Magnet 182 and a brush 184 are attached to a square brass sleeve 186 mounted to slide along a square brass covered bar 188 supported at ends of the box cover 172 to electrically connect brush 184 with rail 174. Brush 184 contacts key strip 190 of insulating material with electrical contacts 192 for brush 184 to run along to code a signal to represent the station. To the right of brush 184, shown in resting position, key 190 has two contacts 192 connected to the positive and three to the negative of battery 196 to identify the station, followed to the right by contact 198 connected through choke coil 199 to the negative of center-grounded battery 196 and through capacitor 200 to the secondary of transformer 202. To the left of brush 184 is contact 204 connected through limit switches 206 closed by a load in correct position on the loader in position to the coupled for transfer, line 208, capacitor 210, and the secondary of transformer 202 to ground in parallel from line 208 with choke coil 211 and battery 196.

When a car 34 approaches the loader from the left, shoe 176 engages rail 174 to move magnet 182 along with magnet 180 so brush 184 moves along key 190 under cover 172, putting two positive pulses, three negative pulses, and a long negative pulse mixed with AC on rail 174. Coils of ratches 164 and 165 are each reversely connected through a rectifier 212 to line 214 connected through normally closed contacts of AC relay 216 to shoe 176 to each step once on respectively each positive and negative pulse except the last which is mixed with AC completing a circuit from shoe 176, capacitor 218, coil of relay 216 to ground of the secondary of the transformer, lifting relay 216; closing a circuit from shoe 176, front contacts of relay 216, normally open contacts of limit switch 220 closed by a container on the car, rectifier 222, choke and coil of time-delay relay 224 to ground. After a time to check that train is at safe speed for transfer, relay 224 closes. If card 160 is punched for this station a circuit is then completed from the positive of battery 226, line 228, connector contacts 230 to the container or pallet, return spring 232 and brush 166 of stepper 164, the hole in card 160, brush 166 of stepper 165, plug and connector contacts 238 to the car, normally open contacts of time-delay 224, line 240, solenoid of valve 242 to ground, and from line 240, hold coil of relay 224 in series with coil and normally closed contacts of timer 244 in series to ground. Valve 242 then connects AIR to the head ends of cylinders 246 which extend couplers 38 on the side of the car that the loader is on until timer 244 opens its contacts after a brief delay sufficient for the car to couple the loader and move the forks in under the load. The forks will then remain coupled until the load is removed from over the pedestals even if the couplers retract before this, since the couplers when retracted still engage the forks. Preferably valve 242 has a cam-wheel operator 248 to engage a fork 42 to hold the valve to AIR while over the car to insure couplers 38 remain extended after coupling until the load and forks clear the side of the car. When shoe 176 leaves rail 174 it momentarily closes limit switch 250, closing a circuit from the positive of battery 226, normally open contacts of limit switch 250 closed as shoe 176 raises or lowers, connector contacts 252 to the container on the car, reset solenoids 254 to ground to lift the pawls of the ratchets so springs 232 will reset them for the next station.

When a car 34 approaches the loader from the right, shoe 176 engages rail 174 to move magnet 182 with magnet 180 so bruch 184 engages segment 204. Thereupon if the car 34 is empty and loader 14 has a load in place for transfer a circuit is completed from rail 174, shoe 176, capacitor 218, and coil of relay 216 to ground, which lifts relay 216 on the AC circuit and connects a circuit from shoe 176 through front contacts of relay 216, normally closed contacts of limit switch 220 closed when berth on the car is empty, line 256, rectifier 258 connected to pass current from the positive of battery 226, choke and coil of relay 224 to ground, and from line 256, front contacts of relay 224, line 240 to solenoid of valve 242 in parallel with a hold coil on relay 224 and the coil of timer 244 to ground, to extend side couplers 246 when the car is empty and moving slowly enough and a load is waiting for transfer on forks 42 in position for coupling.

Referring to FIGS. 15 and 16, loader 14 is power assisted all around its track to return to the start position ready for transfer of a load to or from the next berth or car in the train according to direction of train movement. The loader's motor M1 has its armature connected through reverse switch 260 between line 262 and ground and its field between line 262 and ground. The position terminal of battery 196 is connected to line 262 through hand switch 264 in parallel with radio or track circuit controlled contacts 266 closed when the train approaches the station. Motor M1 is thus running at speed but is disconnected by magnetic clutch C1 before transfer. When a fork 42 is hit by an extended coupler 38 on a car for transfer, the supporting crank arms are telescoped or compressed, releasing pin 86 from behind latch stop 90 and from limit switch 112 which closes a circuit from line 262, limit switch 112R or 112L selected by the position of reverse switch 260 for respectively a train from the right or left, the coil of clutch C1 to ground of battery 196 to connect motor M1 to drive arms 50 in the same direction as the train, the forks being coupled to the car to move the loader so engaged. When the loader 14 is uncoupled after transfer with the train, motor M1 continues to drive the crank arms around the transfer loop and back to the stop 90R or 90L where respectively the limit switch 112R or 112L that is connected by reverse switch 260 is hit, opening the circuit to unclutch the motor from arms 50.

The armature of motor M2 for conveyor 16 is also likewise connected through reverse switch 260. When reverse switch 260 for loader 14 is set to unload a train from the left, a circuit to motor M2 is completed through normally open contacts of limit switches 206' and manual switch 270 in parallel to move conveyor 16 to carry any containers unloaded thereon back from track T at least one container width for room to set the next load from the train. When reverse switch 260 is set to load a train, a circuit to motor M2 is completed through the reverse switch contacts and limit switch 272 to line 262 preferably in series with limit switches 206 and hand switch 270 or additional limit switches 206 to shut off the conveyor when empty. Limit switch stop 272 is struck by a container moving out on conveyor 16 to the stop at the loading position.

Reverse switch 260 is set before switch 264 or contacts 266 are closed and can be set manually or controlled by track circuits which detect train direction to throw the switch accordingly or by levers 276L and 276R beyond the left and right ends of the station and linked together and to throw reverse switch 260 and then close contacts 266 by rod 278. Each lever 276L and 276R has a permanent magnet 280 on the outer end to be shifted by magnet 180 passing over it. These levers are preferably enclosed in nonmagnetic housing 282. Reverse switch 260 is positioned for arms 50 to be at or move around back to wait at the near stop 90R or 90L for train according to the direction of the train and to drive arms 50 in the sme direction as to train after engaging until returned to the same stop to wait for the next transfer.

CONVEYOR RACKS

Referring to FIGS. 1-3 and 15-19, each conveyor rack 16 has two side frames 284 open between and spaced wide apart for supporting the loads 28 or 29 thereacross on equal lengths of endless roller chain 286 having outboard wheels 288, load support plates 290, and pushes pins 292 spaced in transverse alignment at container width plus clearance spacing on each chain 286. Each frame 284 has a top run 294 and a return run 296. The top run of the side frame innermost to the station is supported only at ends beyond the movement of link 44 which travels back and forth and up and down in space between the top and return runs. Rollers 288 run on a track of angle 298 along each side of the chain along the top and return runs with clearance on the frames for plates 290 and pins 292 between the angles along the return run. The chains are each carried over four sprockets 300 in vertical plane, two at each end one above the other. The sprockets at the front and one aligned set at the rear are each on a short shaft 302 mounted between two bearings 304 to frame 284, and the remaining rear set of matched sprockets are keyed on a drive shaft 306 mounted on a bearing 304 on each end on opposite frames 284 to coordinate the two chains 286 to maintain pins 292 aligned. Shaft 306 is driven by motor M2 through spur gearing magnetic clutch C2 so the conveyor can be moved easily by the forks moving a load against a set of aligned pins 292 with the clutch disengaged.

Forks 42 of the loader are moved parallel to the conveyor 16 and each approaches a conveyor side frame 284 preferably equally distanced therefrom and from the same direction (ie. from the same side) while each arm 50 is lifted by its track 66 and then rolls down incline 69, FIG. 19, to set a container on the conveyor. Pins 292 are of such length to be struck well below their top by the container or pallet brought on forks over the conveyor and push the conveyor chains equally along with the container before the container is set on the conveyor, since shaft 306 holds the load parallel even if one side is set down on a conveyor chain before the other side, since both chains are moving at same speed as the load. Since bump rollers 70 along the outer side frame of the conveyor keep the fork aligned with the conveyor while arms 50 move up and down slopes 69, when the container is set down by the forks descending slopes 69.

When the loader is running in reverse to load the train the forks raise tabs 48 between containers spaced apart and engage the tabs against the back side of the container on the front end of conveyor 16 to engage and move that container parallel before the forks lift the container off the end of the conveyor, since the forks are not expected to lift both ends of the container at exactly the same time.

Referring to FIG. 20, the container 28A has four transverse channels 312 turned legs down in its bottom, for forks 42 and conveyor chains 286 to engage in to keep the container aligned thereon.

OPERATION

Following FIGS. 21-23 in sequence to observe train 12 moving from left to right past loader 14, when a car 34 or 34L in train 12 or other vehicle has been coupled to forks 42, FIG. 21, the movement of the car causes a torque on arms 42 and pushes the fork frame 40 along the arms 50 held at about 14°-20° from parallel to the car and pointing toward the approaching train. The arms telescope in against spring 56 to release pin 86 from behind stop 90L and free switch 112L to close to energize clutch C1 to connect motor M1 now running to help start the arms to rotate counterclockwise to move with the car. The arms 50 thus moved extend the forks forward and under the load on the car. When the forks are about fully extended, FIG. 22, arms 50 are lifted by wheels 62 rolling up inclines 68, FIG. 24, on their respective tracks, releasing and lifting the load from the car before arms 50 swing forks 42 out as the arms are rotated back from the train, releasing from side couplers 38 on the car.

When arms 50 are directed to the right approaching 3 O'clock position, FIG. 33, while rotating counterclockwise, fork 42 at right engages bump rollers 70 to limit movement to the right, telescoping arms 50 to carry forks 42 straight back while wheels 62 roll down inclines 69, lowering arms 50, setting the load on conveyor 16. The arms 50, which continue to be turned counterclockwise by momentum and motor M1 run the fork frame 40 around on tracks 66 away from the train and at a sufficiently higher speed around to stop 90L in position and in time to be coupled by the next set of extended couplers 38 along the train even if on the same car 34L or next car 34 or 34L.

LOCAL APPLICATION

The loader is well suited for the small shipper or receiver as well as the large station or shipper and can be used in place of a siding to hold a container or pallet during unloading and or loading and even for short term storage economically, since the container should be less expensive than a railway car.

Referring to FIGS. 25–28 for an application of the translating loader to an industry or warehouse building B along track T, two loaders 14B and 14C are shown in FIG. 25 to show how closely then can operate. The container 28 or pallet 29 can be left on the loader at the destination for unloading or loading, eliminating need for conveyors 16 and 18 to serve the loader. Loader 14B can translate the load off of railway car 34 or other vehicle into building B and later when ready for shipment or return translate the container back out to stop 90R for coupling by an empty car 34 or 34L in the next train. Loaders 14B and 14C are essentially the same as 14 described except their circular tracks 66B and 66C need not be a complete circle, and the arm movement can be simplified.

Loaders 14B and 14C each have two equal crankarms 50 supporting a fork frame 40B having end forks 42 with ends tapered for coupling and shorter load forks 42b which do not engage couplers. Each crank arm has its crankshaft 58 in a vertical column 60 just outside of wall 314 of building B. Tracks 66B and 66C preferably have lift slopes at the ends to stop arms 50 before frame 40B hits the wall of the building, or bumpers 315 can cushion the loader from wall 314. Building B has a recessed berth 316 to receive the loader 14B with a container or pallet. Berth 316 has side wall 317 and end walls 318 each with a door 319 for access to the load. Berth 316 can be covered by overhead door 319' so a load therein is out of the weather and protected, in which case walls 317 and 318 can be omitted.

Each crankshaft 58B of loader 14B is slip keyed in tube 320 mounted to rotate in column 60. Tube 320 has a spur gear 321 secured on top engaging a spur gear 322 secured on a shaft 323 extending down with spur gear 322' secured thereon below track 66B. Each spur gear 322' is engaged by a rack 324 connected by bar 325 to double-acting air cylinder 326 to rotate arms 50 in either direction. Opposite ends of cylinder 326 are connected through three-way hand valve 327 to exhaust or AIR to move the forks into the building or out to a stop and are connected through pressure opened bypass valve 327 to free the arms 50 to move with a vehicle coupled.

The loader 14B with load ready for a train is moved from berth 316 by moving valve 327 to connect AIR to the head end of cylinder 326, moving gear racks 324 to the right, turning gears 322 and 322' counterclockwise and turning gear 321 and arms 50 clockwise past dead centers and against stop 90R. When an empty car is train 12 from right extends side couplers 38 and latches the loader's fork 42, arms 50 are telescoped by the train's movement to free the the loader from stop 90R to move clockwise with the car to extend the load thereover, set it down thereon, and swing the empty fork frame out to latch behind stop 90L free from the side couplers 38 on the car which are thereafter retracted promptly into the car. If the train is always at a speed above slowest creep cam linkage 248 of FIG. 14 can be omitted and couplers 38 retracted soon after coupling, remaining coupled even when retracted until after the arms 50 are swung by momentum clear from the car and latched behind stop 90L.

Loader 14C can swing the container off a railway car or other vehicle moving from left to right completely operated by motion of the vehicle delivering the load. When the container is ready for shipment the loader is moved a few degrees by hand from the position shown in phantom along side the building to coupling stop 90R for coupling an empty car in a train moving to the left to take the container. Loader 14C does not move to dead center, the fork frame is sufficient to coordinate the arms.

Loaders 14B and 14C when emptied of loads by a train moving to the left are swung to the left out from the train to latch behind stops 90L in position to be coupled by a car in a train from the left to deposit a load on the loader while swinging it back to the right along side of building B.

Referring to FIG. 28, a pedestal bed semitrailer 334, as in FIGS. 14–18 of my patent application Ser. No. 741,680 can be pulled along by a highway tractor on road on track T in place of the train to receive or deliver a container of pallet on the same loader served by the train.

Where space permits between building B and track T it is desired to provide a loader 14D, FIG. 29, so it cannot hit the building etc. This loader runs with the load lifted to a yard, side of building, dock, or station platform B' either way around its track 66D according to the movement of the transport vehicle thereby.

Where desired to ship and receive containers from either direction with one loader along a railway etc. loader 14D, FIGS. 29–31, is generally applicable. Loader 14D is supported on track loops 66D mounted on rollers 340 to revolve around the axis of its crankshaft 58D between stops 342R and 342L approximately 90° apart to shift the track to change the loader from left to right hand according if the train will approach for unloading from left or right, oppositely for loading. Each track loop 66D is a cam plate 344 rolled into a large diameter and welded to form a circle with channel track 346 welded legs down on top of plate 344, an angle ring 348 welded legs out around plate 344 supported on rollers 340 on angle ring 349 legs in on concrete base 106. A gear rack 350 is secured around a little over 90° on the bottom of plate 344. Each loop 66D is turned by a worm gear 352 engaging rack 350 and secured on shaft 354 connecting the worm gears and supported in bearings 356 in trench 358. Shaft 354 is turned by gearmotor M3 to turn track 66D between stops 342R and 342L to a position for the loader to receive or send a load on a train from either direction according to which stop the track is set to. Track loops are revolved 90° so ramp 69 replaces ramp 68 at the front; this puts ramp 68 at the left end of the transfer run opposite to where ramp 69 was. The cam wrap-out for track loops 66D can be the same as for track 66 where the plateau between the slopes is less than 90° or the plateau for loop 66D is preferably near 270° of the circle, so slope 69 is switched between the right and left ends of the transfer run along track T to lift the load over car 34 coupled from the left until the load is aligned thereover when wheel 62 runs down slope 68 now at the front.

Arms 50D are connected by gearing and shafting to turn and keep parallel through dead centers. A beveled gear 362 secured on top of tube 320D is straight splined to each crank shaft 58D so the crankshaft can slide up and down in the tube and turn therewith. Tube 320D is mounted to turn in column 60D embedded in a concrete foundation base 106. Each gear 362 is engaged by a beveled gear 367 on a shaft 368. Shafts 368 are connected through reverse gearing 370 to gearmotor M1 to oppositely rotate shafts 368 to turn arms 50D in the same direction. Motor M1 turns arms 50D around respectively clockwise or counterclockwise according to which stop 90R or 90L is to be used according if the train or transport vehicle is from the right or left.

Track loops 66D can be positioned to receive or send a load on a train from either direction according to which stop the loops are set. Fork frame 14D with or without load a is preferably held by latch stops or a brake in the rear position shown at the top of FIG. 29 while track 66D is shifted by motor M3. The track loops can be shifted after the loader has brought in a load from a train or other vehicle while waiting to put the load on another train or vehicle moving in the same direction. This track shift also provides a way to lift and lower the load by turning slopes 68 or 69 under wheels 62 while the arms 50D forks and load are held horizontally.

Referring to FIG. 34, each crank arm 50 etc. can be carried on a truck 374 having two wheels 62 each connected on a shaft 92 held radially from the crankshaft by curved side plates 376 and 377 pivotally secured on shaft 378 supported between channels 380 depending down from channels 74 of the crank arm.

FURTHER VARIATIONS

Referring to FIG. 35, container 28E on car 34E has end tabs 384 for lifting the container off of the car using loader 14E having upper forks 42E on ends of frame 40E. Frame 40E has vertical end members 386 and top and bottom connecting tubes 388. Frame 40E is mounted on crankpins 52E secured on top of crank arms 50E of the loader. Arms 50E are in the form of a right-angle bell crank having a wheel 62 on the load end to run on track loop a wheel 62' on the other end to run on a track loop 66'E similar to and concentric with loop 66E but with slopes 68 and 69 displaced 90° from those on loop 66E and 66'E to better support the load when removed from the train. This feature is applicable in all the examples.

Loader 14E can set the container down on roller conveyor 390 parallel to track T or pick it up therefrom by slopes 69 about 75° from slopes 68 in each of tracks 66E and 66'E. Arms 50E are connected underground as described to turn together past dead centers. Container 28E has end latching couplers 38C to engage forks 42E, and car 34E has side coupling latches 38 for latching to the container when positioned along track T for transfer.

Referring to FIGS. 36 and 37, a smaller container 28EP similar container 28E is a passenger cage in a passenger railway car 34P having a berth therefore partitioned off from aisle 394. The loader 14E of same the length as the container can serve this car.

The loader arms 50E are rotated clockwise, FIGS. 35 and 38–40, to unload car 34E moving from the observer and set container 28E on roller bed 390 and disengage it the arms are rotated counterclockwise to engage container 28EP at the end stop 396 of conveyor 390 and lift the container to wait at stop 90R to load it on a train moving toward an observer.

Referring to FIG. 41, flat bed trailer 334 can also be loaded and unloaded by being driven past this loader respectively to and from the observer.

Referring to FIG. 42, container 28F has side eyes 400 for hook pins 402 as in my patent application Ser. No. 741,680, FIGS. 100–102. Pins 402 on the upright frame 40F of loader 14F engage in eyes 400 to lift off and set down the container. Frame 40F is of the same length as the container 28F to be latched by side couplers 38 on car 34 when the loader is empty and brought to stop 90R at side-coupling distance from track T or when a container is on hooks 402 at stop 90L to be side coupled by the same couplers. Frame 40F has vertical wheels 404 which engage the side of container 28E to prop it vertical. Frame 40F is supported on high vertical crankpins 52E secured on arms 50 which ride on circular track loops 66D' under covers 94 to lift and lower the container between roller conveyor 390 and a parallel running vehicle. Track loops 66D' are preferably the same as 66E but are mounted to rotate as 66D. Arms 50 are lifted by rotating track 66D' to lift wheels 62 on slopes 68 or 69 while wheels 404 are pushed against the side of container on the end of conveyor 390 aligned to engage pins 402 in eyes 400.

Referring to FIGS. 43–44 where loader 14F' has arms 50F' suspended from above to have an area free along the lifting side of container 28F for side door loading and unloading at platform P for passenger transfer to or from train 12. The loader has a vertical frame 40F' of top link 44F' with depending coupling arms 386F at each end and hooks 402 along link 44F' to engage eyes 400 of container 28F and vertical wheels 404 near the bottom of arms 386F to engage and prop the container level. Frame 40F' is the same length as container 28F and suspended on long crankpins 52F secured vertically on carriage 54 upside down on arms 50F'. Arms 50F' can each be made of two channels 74 spaced apart back-to-back with spacer plates 78 and 80 for spring 56 as in FIGS. 4–7 upside down to extend carriage 54 to the outer end of arm 50F'. Arms 50F' are suspended at the swivel end on a crank eccentric 408 supported to turn in a bearing in a hole in beam 410 with offset shaft 411 below depending through trunion 412 between channels 74 supporting the arm on a collar 413 below to tilt with slopes as in track 66, FIG. 15, along I-beam track 66F' curved to a radius approximately to the swivel center of the arm and suspended from the ceiling or supports. Travel of arms 50F' has no dead centers and is approximately 90° of which approximately 60° are for lifting the container. Stops 90L and 90R are suspended upside down from the ceiling or support. Arms 50F' are connected equally a short way from the eccentric mount by a connecting rod 414 linked to double-acting air cylinder 415 to swing the arms back after transfer for the next transfer. The upper ends of crankshaft eccentrics 408 each have a gear segment 416 secured concentric thereon engaging a rack 417 connected to the rod of double-acting air cylinder 418 to rotate the eccentrics to retract arms 50F' so frame 40F' clears cars in the train when frame 40F' is returned to coupling position for another transfer run. Arms 50F' are extended back out by reversing pressure to cylinder 418; then returning cylinder 415 to exhaust. A lift section of belt-under-roller conveyor 390 engages and disengages containers 28F' or 28F from hooks 402. Conveyor 390 can connect two opposite-hand loaders to unload and reload a train from either direction.

A car 34P in a train moving toward the observer, FIG. 44, with a container and 28F for the station extends latches 38 to couple this loader, releasing it from stop 90L, swinging arms 50F' counterclockwise, engaging frame 40F' against the container, pushing carriages 54 back. The frame is lifted up slopes 68 engaging hooks 402 in eyes 400 before arms 50F' swing away from the car with the container removed from the car to the platform clear from the car. To remove the container from the loader, the elevator section of conveyor 390 is lifted, lifting the container off hooks 402 and aligning it with the rest of conveyor 390 to move away.

To load the container on a train, loader frame 40F' is first positioned along platform P, then the container is run to the loader end of conveyor 390 and lowered onto hooks 402. Then the loader is moved out a little to stop 90R to wait for an empty car 34F' to be coupled and loaded as described by movement of the train.

Referring to FIGS. 45–49, more than two crank arms not in line can be used to better support heavy loads and eliminate dead centers.

Loader 14G, FIG. 45, has four crank arms 50, two in front and two behind, connected either by separate links or preferably by a linkage frame 44G integral with the forks 42. The conveyor rack 16 is extended back and supported for the crank arms to clear. The outer run of rack 16 has bump rollers 70 which guide frame 44G straight during lifting and lowering of the forks so the load can be accurately positioned across conveyor 16. Linkage frame 44G clears under the inner run of conveyor 16 with only the forks communicating above and below the conveyor runs to set down or lift off loads as described for FIGS. 1–24. The fork frame 44G is the only connection between the crank arms. There is no dead center with this design, so only one crank arm has a drive sprocket or gear to connect motor M1 through clutch C1.

Referring to FIG. 46, instead of horizontal forks, loader 14H has a frame including a vertical side 40H with top hooks 402 to engage container 28F of FIG. 42, braced integral on a rectangular linkage 44H supported on four equal arms 50. Vertical wheels 404 on a side members of frame 40H engage side of container 28F to hold the container level on hooks 28F. Loader 14H can replace the loader 14E in FIG. 42.

Referring to FIGS. 47–49 for a plan for handling either containers or trailers using loaders with respectively two, three, and five transfer arms 50, with coplainer integral fork frame 40J, 40K, and 40L respectively. Transfer is between parallel ways T and D, the outer way T being a running way and the inner way D being for substantially stationary loading and unloading. One or more slip plates 424 prevent the load from being dragged on the inner way by the forks 42 engaging and disengagig the load. The two crank loader, FIG. 47, has a chain 142 around sprocket tooth rack 146 around covers 94 to coordinate the crank arms 50 parallel through dead centers. The three and five crank loaders have no dead centers and only triangular linkage frames 44K and 44L connecting the arms 50, since the arms are not in a line.

Referring to FIGS. 49–52 for handling two trailers at a time using the five-crank loader 14L at a correct height for reaching under two trailers 430 on car 34L' with a coupling fork 42 at each end and two or more intermediate forks 42b positioned to lift two trailers 433. The trailers are loaded on car 34L' back to back to reduce the number of required kingpin bolsters 432 to one at each end of the car, and to keep the car deck free of obstruction above curbs 434 for the trailer wheels 436 at the center of the car, and to prevent opening of the rear trailer doors enroute, and to standardize the positioning of the trailers. This also enables both trailers to be backed to a loading position simultaneously from opposite directions and to be each coupled by a tractor and driven away simultaneously in opposite directions after being set down on the driveway D. Forks 42, when extended over car 34L' automatically open the bolsters to receive or release the kingpins 438 on the trailers and lock the trailers when retracted after setting trailers on the car. The landing wheels are left down sufficient to set on the driveway. All trailer wheels are set on shift plates 424.

Shift plates 424 in driveway D are the full width of the driveway and located where the trailers' wheels are set down and or lifted off by forks 42 and 42b and have a curb bar 442 along the back side from track T to keep the trailer wheels from overrunning the plate. Plate 424 is mounted to roll transversely on longitudinal rollers 444 held in a frame 446. Rollers 444 are supported on a subfloor top of a base or stand 448 as needed for height of plate 424 to be about at the same level as the floor of railway car 34L'. Levers 450 are pivotally secured on shaft 451 to base 448 and extend up between tabs 452 on frame 446 and are held vertically by coil springs 454 on each side between base 448 and the levers to hold plate 424 central of the driveway except when moved by the trailer wheels when the forks engage and disengage the trailers on the plates to thereby prevent sidewise skidding.

Forks 42 automatically release kingpin locks 458 on the bolsters 432, FIGS. 53 and 54, on railway cars 34L'. A fork 42 is shown being inserted along side the bolster thus releasing the locks. I modify the bolster of U.S. Pat. No. 3,168,876, FIGS. 7-14, to make it automatic to be opened by the forks 42. Lock 458 has transverse kingpin guide channels 460 and 462 tapered on the ends to receive a kingpin therebetween and two latches 464 secured on the back of channel 460 to latch the kingpin 438 therebetween and between the channels. Cam rollers 468 on outer ends of U-bars 470 having opposite ends secured to a latch pin 464 are engaged by a fork 42 to move latches 464 back from channel 460 to free the kingpin whenever the forks are extended halfway or more over the car coupled by them whether the forks are lifted or lowered to open the channels to receive the kingpin or release it whenever trailers are transferred to or from the car.

Referring to FIGS. 55–57, the loader can be mounted on a turntable 470 mounted on a vehicle such as a rail or road vehicle 472 to be operated along run T2 between parallel rack rails 474 that provide convient storage for containers across the rack sides, FIG. 55.

The preferred loader for this is a top fork loader 14E for handling containers 28E and mounted on a turntable 470 with extension arms 476 to support columns 60 and track loops 66. Container 28E can be removed from a moving or standing railway car 34E or trailer bed by latching forks 42 to the containers extended couplers 38C ahead of arms 50 and moving either or both vehicles toward each other. Forks 42 are carried under tabs 384. Track loops 66 lift the revolving arms, lifting the forks and container thereon and carry the container straight back from the car to rest on the loader 14E. The loader is rotated 90° on turntable 470 either way by motor M4 through worm and gear around the turntable so the lifted arms are swung straight endward the vehicle and moved to a convient spot along run T2 to set the container across rails 474 by rotating arms 50 a few degrees further on track 66 to lower. The loader vehicle is then backed away along run T2 to retract the forks. In reverse the loader can run forks under a load on rails 474, turn arms 50 a few degrees to lift the load and turn table 470 90° to the position of FIG. 55, ready to engage the container with extended side couplers on a car 34E to move arms 50 theretoward to extend forks 42 and set the load on the car and continue rotating the arms to retract the empty forks in about 150° of rotation.

Referring to FIGS. 58-62, the loader 14D is mounted on a powered rail vehicle 472R on track T2' along track T1 a distance away for a driveway platform D parallel therebetween for transfer of trailers 430 between cars 34' on track T and the driveway D. Vehicle 472R has a bed frame 480 mounted on railway wheels 482, an operator's cab 484 at one end, a loader 14D, a counterweight and or outrigger wheels 486 which run in a channel 488 secured on posts in concrete footings. The loader has two crank arms 50 mounted in vertical columns 60 secured to the frame 480 and extending under the bed, a rotary track loop 66D to support each arm 50 to rotate 360°, fork frame 40 connecting arms 50 parallel supported on the crankpins thereof, and clutch C1 and motor M1 connected as in FIG. 15 to turn arms 50 together parallel between stops 90R and 90L at about where arms 50 extend 16°-20° out from vehicle 472R respectively to right and left to a coupling distance from track T to side couple car 34' to forks 42.

A car 34' moving by with latches 38 extended will couple the forks 42 so positioned. If the car is moving in the direction against arms 50 the arms are moved around about 140°-150° extending the forks under the trailer, releasing the kingpin, lifting the forks when fully extended after about 70° of the swing and removing the trailer straight from the car and spotting it over the driveway. Track loops 66D are then revolved to set the trailer down straight on the driveway. If the car on track T is standing, vehicle 472R can be moved with arms 50 extended forward at about 16°-20° out against stop 90R or 90L to latch forks between side couplers 38 extended on a car 34' to release the stop and rotate arms 50 out, extending forks straight out under trailer 430 to release and lift and remove the trailer straight to the side as the arms are rotated. The trailer is carried by vehicle 472R to align over the driveway and track loops 66D are rotated a few degrees the by operator control of the vehicle to set the trailer on the driveway. This was equal to moving the car in the opposite direction, since it is the relative movement between the car and loader that turns arms 50 to extend, lift, and retract forks 42. Loader 14 so mounted can operate in reverse to load a moving or standing car. Arms 50 can also be swung around back to carry the trailer on the transfer vehicle without overhang.

Referring to FIG. 63, train 12, passing station SM from right to left, is on track T with containers 28 for the station being unloaded by the loader 14D on vehicle 472R which has set the container 28 from the first car 34 at the right and is lifting from the second container 28 off the second car 34. Forks 42 are engaged and swung out counterclockwise over each car with a load for the station and carries the load to the left and back above pedestals 486 between tracks T and T2 and sets it thereon. The arms continue the counterclockwise rotation as the transfer vehicle 472R is indexed to the left along its track until the cab 484 is aligned as shown with the end of the container 28 just set down before next vacant berth. Arms 50 are moved around to stop 90L when clear from the end of the container set down ready to be latched by next car with a load for the station continuing the unloading process.

Referring to FIG. 64, another train 12 passing this station left to right on track T has an empty car 34 for loading. The loader 14 is shown with a container lifted from storage pedestals 486 and engaging stop 90R to be coupled by empty car 34 aligned, which will swing arms 50 clockwise, extending forks 42 with the container over the car and lower the container onto pedestals 36. The forks will swing out empty to the right. The arms continue the rotation clockwise around back to bring forks 42 over the rear of the transfer vehicle. When arms 50 have cleared the container ahead, the loader is indexed to align forks 42 when at the rear to swing under the next container for this train and move the arms to stop 90R to wait for the next empty car 34 to latch the forks to receive the container etc.

It should be observed that the loader is indexed in the same direction as the train movement thus has more time to unload or load up for the next transfer than if stationary. The loader can operate in either direction for loading or unloading.

Referring to FIG. 65, forks 42 can be mounted on pins 490 to them secure to fork frame 40 so the forks can be swung up and over to the other side of the transfer vehicle, so when the loader arms 50 and track loops 66D are revolved 180° this loader on vehicle 472 can transfer along the other side.

Referring to FIGS. 66 and 67, the loader can be applied to high speed transfers between parallel running vehicles. Transfer vehicle 472V on track T3 has a top fork loader 14EF for putting a container 28F' on and simultaneously removing one from car 34F'' at speed or while stationary along parallel tracks T and T3. Vehicle 472V has a vertical rectangular frame having at each end a vertical column 60V connected at the bottom and top by parallel tubes 497. The frame includes a horizontal semicircular leg 494 extending from one side at the bottom of each column 60V and a top leg 495 extending to the same side at the top of each column 60V. Legs 494 each have a semicircular track 66S concentric from the column at the end. Each column 60V has mounted thereon to rotate and lift a tubular a crank shaft 58T of crank 50V having two parallel arms secured one at the top and one at the bottom of its crank shaft and each connected at the opposite ends by a large vertical crankpin 52V. Each crank 50V is supported by a wheel 62 on the track 66S thereunder. The fork frame 40V has tubular end members 498 each on a crank pin 52V between the top and bottom arms of crank 50V and connected by top and bottom structural tubes 388 to form a vertical rectangular frame 40V supported to translate on the ends of the cranks 50V extending its fork to the same side as the legs 494 and 495. A swivel truck 502 supports each end of each bottom leg 494 to run on bottom rail 504 and a horizontal wheel 506 is mounted on top of the end of each top leg 495 to run between top rails 508 supported on brackets 510 from poles 512 along track T3 on the opposite side from track T to hold vehicle 472V upright. Transfer carrier 472V can be powered by any suitable means and controlled to attain a safe speed for transfer of containers with car 34F''. The loop track 66S under each crank arm concentric with its crankshaft lifts and lowers the fork frame as it is translated for transfer.

Fork frame 40V for the transfer application illustrated uses forks 42 only for coupling and has hook pins 402 secured along tube 500 to support two containers 28F' each at a different height, one at the rear lower than one at the front. Vertical wheels 404 parallel the forks along the bottom tube 501 hold containers vertical when hooked on the fork frame. Track loops 66S have dip 68S at the front down and back up about half way to dip pins 402 to set a container in the rear berth on car 34F" and to lift out a container in the front berth on the car.

This transfer vehicle with a container 28F' only on the rear low hooks 402 is accelerated ahead of car 34F" to speed for transfer. Arms 50V are held trailing at an angle 15°–20° out to the stop 90L for the car 34F" with extended side couplers 38 to couple forks 42 at a safe speed difference to swing the a container into the rear berth and lift container from the forward berth and swing it out front of the transfer vehicle which carries it to a station where it is lifted off as in FIGS. 132-134 of my pending patent application Ser. No. 741,680. The transfer vehicle is indexed a container length forward at the station, and the container is reset on the rear hooks ready for the next transfer run. The container on the car is moved to a forward berth leaving the rear berth empty to receive the next container.

For a long-haul passenger-type railway it is desired to put a container in a berth as soon as one is taken out to complete the streamlined side and more fully utilize space on the car. For this operation refer to FIGS. 36, 37 and 69 where two loader vehicles 472V' on track T3 are shown coupled by spacing link 520 between coupling pins 522. Link 520 spaces the loader vehicles for transfer without interference therebetween. Both loaders are the same as loader 472V except these loaders have tracks 66D as in FIG. 31, instead of 66S and the loader at rear is empty and has its track 66D set to unload while the one on the front vehicle has a container, and its track 66D is set at a height to load the car 34P. They make transfer runs starting with the rear loader empty and a container 28EP on the front loader. Both loaders have arms 50V extended back approximately 16°–20° toward track T before vehicles 472V' start. The coupled loading vehicles 472V' are accelerated ahead of car 34p having a berth with a container 28EP. The loader vehicles when running at a safe transfer speed less than and ahead of the car has its empty rear loader engaged first by extended side couplers 38 on the car, swinging loader arms 50V forward, engaging forks 42E under tabs 384 of container 28EP of hooks 402 under eyes 400 of container 28EF. Slope (68) of track 66D, FIG. 31, lifts the arms and forks as the arms rotate forward past full extended position while the forks are fully inserted to lift up the container and translate it out forward on the rear loader. The load on the forward loader is then latched to the side couplers 38 which swings the foward loader's arms forward, moving the lifted forks on the plateau of track 66D until fully extended over the berth and lowers the container into the berth just emptied. The arms 50V continue forward by the speed difference and swing out from the car with the forks down empty. The loader vehicles stops at a station and can operate in reverse to serve a train in the opposite direction or the container can be taken off and put on the rear loader for the next transfer run.

Using this loader the transfer vehicle runs slower than the train while transferring containers therebetween. This saves acceleration and braking time and energy over my prior application Ser. No. 741,680, FIGS. 124-134, recommended for further details.

Having thus described some embodiments and applications of my invention I do not wish to be limited only to the disclosure herein but intend to cover in the appended claims all modifications and applications which are within the true spirit and scope of this invention.

I claim as my invention:

1. A load transfer system including a plurality of vertical columns spaced apart each having a crank arm mounted thereon to turn, a crank pin on each said arm at a substantially equal distance from the column that the crank arm is mounted on, linkage means connecting the said crank pin of each said arm to turn the arms substantially equally and translate the linkage means horizontally when said linkage is engaged and moved, load engaging means on said linkage means for engaging a load for transfer, said arms being free to move for transfer, and means for lifting and lowering said load engaging means for engaging and disengaging said load engaging means with a load and lifting for transfer of the load by rotation of said arms in one direction for each transfer.

2. In a system as in claim 1, said means for lifting and lowering being a cam track having a rail of radius substantially centered on each said column, and at least one supporting wheel for supporting the arm on the cam track, each said rail having a similar vertical contour including a slope each for lifting or lowering the said wheel thereon when said load engaging means is farthest from said columns according to the direction of rotation of the arms for lifting or lowering a load on said load engaging means while translating on an arc about said columns.

3. In a system as in claim 2 a rotary enclosure concentric on each said vertical column enclosing each said cam track rail and wheel.

4. A system as in claim 2, said engaging means being parallel fork tines extending out from said linkage means to engage under a load.

5. A system as in claim 4 and positioning means overlaying said linkage means and having runners parallel to said forks in the space to one side of each said fork and at a height to receive a load from the forks when the arms are lowered by revolving on said track, the load being transversely moveable along the length of said runners for storage of a plurality of loads thereon, each said arm completing a revolution returning to its starting position.

6. A system as in claim 2, said track being loops mounted to rotate each loop simultaneously to reverse transfer.

7. In a system as in claim 2, a vehicle way and a feeding conveyor at right angles thereto with said load transfer system therebetween, rail of said cam track having two slopes up about 90° apart connected by a plateau to lift a load between a vehicle on said way and said conveyor.

8. A system as in claim 1 and load positioning means under said linkage means, said load engaging means supporting the load above the bottom of the load.

9. A system as in claim 1, each said arm having an inner portion and an outer end mounted on the inner portion to have limited travel along said inner portion and means resiliently extending said outer end of each arm to telescope to take coupling shock, said linkage being mounted on the outer ends of the arms.

10. A system as in claim 9 and guide means for telescoping said arms to guide said engaging means straight backward to align and forward a load.

11. A system as in claim 9 and guide means for telescoping said arms to guide said engaging means straight across the arc for the arms along where the load engaging means is fully extended from the crank shafts.

12. A system as in claim 9, a stop including a latch and a depending pin on said outer end of said arm for latching with said latch pin to pass the arm when traveling away from the run but to hold the arm when forced toward the way against the stop until the engaging means are coupled, forcing the arms to telescope to move the stop pin in from behind the stop latch to start the arms in translation for a transfer run.

13. In a system as in claim 1 said arms being in a line, means for coordinating said arms past dead center.

14. In a system as in claim 1, the diameter of the locii of said crank pins in a revolution of the arms being less than the length of the engaging means so the loader can be returned for transfer of successive loads moving along a way.

15. In a system as in claim 1, a vehicle, said columns being mounted on the vehicle, a line of loads, a way for said vehicle parallel said line, said engaging means reaching between said line of loads and said line of vehicles in less than a quadrant of arc of turning of the arms for transfer therebetween of said loads.

16. A system as in claim 1 there being at least three of the crank arms arranged in a plurality of rows and means including said linkage means connecting the crank pins of all of the arms to eliminate dead centers.

17. A system as in claim 1 and power means for moving said arms around after said frame is uncoupled from a vehicle to complete a full revolution of said arms to starting position.

18. A system as in claim 17, said power means being reversible, a latch stop means at opposite ends of the transfer run to hold the arms at the beginning of the run in either direction of movement around the columns.

19. A system as in claim 1, the loader being located along a railway for transfer of cargo etc. to and from trains nonstop.

20. A system as in claim 1 and vehicle means for positioning a load or receiving a load for transfer to or from said load engaging means, and means for moving the vehicle and load engaging means in longitudinal alignment for moving the load engaging means around said columns sidewise to the vehicle means and back away for transfer of the load by parallel rotation of said arms.

21. In a system as in claim 1, a vehicle and means for guiding the vehicle past said load transfer system, positioning means for holding said arms at a starting angle toward the approaching said vehicle, side coupling means on said vehicle for engaging said linkage means when held by said positioning means as said vehicle reaches alignment with said linkage from the direction in which the arms are turned to rotate said the and extend said linkage means to said vehicle to move a load onto or engage a load for removal from said vehicle and to further rotate the arms in same direction to translate the load frame away from said vehicle for transfer of the load to or from the vehicle.

22. A loader for transfer of a load to or from a vehicle with relative movement past the loader, the loader having substantially horizontal, parallel, and equal crank arms having their pivots horizontally spaced apart, at least one (a) link connecting said arms into a parallelogram linkage, load transfer means on said link, said linkage being free to be moved about a transfer arc whereby a vehicle moving tangentially by the arc can engage the loader and move it around said arc to transfer a load with respect to the vehicle, and cam means for lifting and lowering said load transfer means for transfer of the load when tangent to the arc.

23. A loader as in claim 22 and a vehicle on which the loader is mounted for operation by travel of that vehicle to engage the loader and move it to rotate its arms for transfer of the load.

24. A load transfer system comprising: a load, a vehicle way having a vehicle thereon having a berth for carrying said load, a loader including a support frame for said load, radial means defining a horizontal arc for supporting said frame to move said frame in said horizontal arc and facing said way while moving toward and away from said way to bring said frame into alignment at tangency for load transfer relation with said load when on said vehicle on said way, and means for engaging and disengaging said frame with said vehicle for movement of said frame and vehicle together passing said arc to effect transfer of the load between said vehicle and said frame.

25. In a system as in claim 24, said means for engaging and disengaging including a track forming said arc having slopes for lifting and lowering said frame to lift or set down a load according to the direction of movement of said vehicle therewith.

26. In a system as in claim 25 means for moving said track to lift and lower said arms.

27. In a system as in claim 24, said means for supporting said translating being: parallel radial crank arms, a vertical crank column and cam track supporting each said arm as it is turned, each said cam track having a slope to simultaneously lift or lower said frame as said arms are turned to transfer a load.

* * * * *